(12) United States Patent
Pomatto

(10) Patent No.: US 12,182,388 B1
(45) Date of Patent: Dec. 31, 2024

(54) PHYSICAL CONTROL SYSTEM DATA REPLAY INTERFACE

(71) Applicant: SYSTEMS ANALYSIS & INTEGRATION, INC., Orange, CA (US)

(72) Inventor: Lawrence Anthony Pomatto, Santa Ana, CA (US)

(73) Assignee: Systems Analysis & Integration, Inc., Orange, CA (US)

(*) Notice: Subject to any disclaimer, the term of this patent is extended or adjusted under 35 U.S.C. 154(b) by 39 days.

(21) Appl. No.: 17/707,583

(22) Filed: Mar. 29, 2022

Related U.S. Application Data

(60) Provisional application No. 63/169,013, filed on Mar. 31, 2021.

(51) Int. Cl.
*G06F 3/04847* (2022.01)
*G06F 3/04842* (2022.01)
*G06F 3/04845* (2022.01)

(52) U.S. Cl.
CPC ...... *G06F 3/04847* (2013.01); *G06F 3/04842* (2013.01); *G06F 3/04845* (2013.01)

(58) Field of Classification Search
None
See application file for complete search history.

(56) References Cited

U.S. PATENT DOCUMENTS

| | | | | |
|---|---|---|---|---|
| 11,588,922 B2 * | 2/2023 | Damale | ............... | H04L 67/10 |
| 2003/0220999 A1 * | 11/2003 | Emerson | ............ | H04N 21/8455 |
| | | | | 709/224 |
| 2005/0033481 A1 * | 2/2005 | Budhraja | ............... | H02J 3/008 |
| | | | | 700/286 |
| 2005/0034148 A1 * | 2/2005 | Jaeger | ................ | G06F 3/04847 |
| | | | | 707/999.107 |
| 2008/0294275 A1 * | 11/2008 | Reichard | ............. | G05B 19/042 |
| | | | | 700/88 |

(Continued)

OTHER PUBLICATIONS

Marius Sucan, KeyPress OSD, Apr. 11, 2019, https://web.archive.org/web/20190411084541/https://keypressosd.com/ (Year: 2019).*

*Primary Examiner* — Henry Orr
(74) *Attorney, Agent, or Firm* — Knobbe, Martens, Olson & Bear LLP

(57) ABSTRACT

An improved physical control system environment that allows an operator to replay historical data in a user interface that depicts content as if the data being displayed in the user interface is being captured or measured in real-time is described herein. For example, the improved physical control system environment can produce an improved user interface that depicts graphical representation(s) of one or more physical components optionally arranged by geography, similar to the graphical representation(s) that are depicted by a physical control system user interface that displays real-time data. However, the underlying data depicted in the improved user interface may be historical data rather than real-time data. The improved user interface may display the historical data in association with the appropriate physical component graphical representation(s), with the appearance of the graphical representation(s) changing in size, shape, color, or other form based on the historical data and at a user-selected speed.

21 Claims, 7 Drawing Sheets

(56) References Cited

U.S. PATENT DOCUMENTS

| | | | |
|---|---|---|---|
| 2012/0278015 A1* | 11/2012 | Budhraja | G01R 21/133 |
| | | | 702/62 |
| 2012/0290107 A1* | 11/2012 | Carlson | G05B 19/058 |
| | | | 700/83 |
| 2017/0132024 A1* | 5/2017 | Desineni | G06F 8/61 |
| 2017/0208151 A1* | 7/2017 | Gil | G06F 21/57 |
| 2020/0012265 A1* | 1/2020 | Thomsen | G06F 3/0481 |

\* cited by examiner

PHYSICAL CONTROL SYSTEM DATA REPLAY INTERFACE

CROSS-REFERENCE TO RELATED APPLICATIONS

This application claims priority under 35 U.S.C. § 119(e) to U.S. Provisional Application No. 63/169,013, entitled "PHYSICAL CONTROL SYSTEM DATA REPLAY INTERFACE" and filed on Mar. 31, 2021, which is hereby incorporated by reference herein in its entirety.

BACKGROUND

Physical control systems, such as supervisory control and data acquisition (SCADA) systems, are generally used to monitor and/or control critical infrastructure (e.g., water treatment plants, wastewater collection systems, power plants or other electrical power generation systems, electric power transmission systems, oil and/or gas distribution systems, telecommunications systems, etc.), industrial processes (e.g., manufacturing systems, fabrication systems, etc.), and/or operations of other facilities (e.g., buildings, transportation hubs, warehouses, etc.). For example, a physical control system may obtain, process, and/or display real-time data associated with the entity being monitored or controlled. The real-time data may include values measured or captured by sensors associated with various components (e.g., infrastructure components, industrial process components, facilities components, etc.) within a short window of time of a current time (e.g., within 100 ms of a current time, within 500 ms of a current time, etc.). The SCADA system can cause a user interface to display the real-time data, and an operator operating the SCADA system can view the user interface to monitor and/or control the appropriate components in accordance with the real-time data being displayed.

SUMMARY

The systems and methods described herein each have several aspects, no single one of which is solely responsible for its desirable attributes. Without limiting the scope of this disclosure, several non-limiting features will now be discussed briefly.

One aspect of the disclosure provides a device comprising memory storing computer-executable instructions. The device further comprises a processor in communication with the memory, where the computer-executable instructions, when executed by the processor, cause the processor to at least: process a selection of one or more screen replay options received via a user interface, where the user interface depicts, for each physical component in a plurality of physical components, a graphical representation of the respective physical component and a current measurement associated with the respective physical component; retrieve historical data corresponding to the one or more screen replay options; identify a portion of the retrieved historical data that corresponds to the graphical representation of a first physical component in the plurality of physical components; and update the user interface to modify repeatedly an appearance of the graphical representation of the first physical component in accordance with the identified portion of the retrieved historical data that corresponds to the graphical representation of the first physical component at a speed defined by the one or more screen replay options.

The device of the preceding paragraph can include any sub-combination of the following features: where the updated user interface comprises a slider configured to move along a slider bar, and where a position of the slider along the slider bar controls a portion of the portion of the retrieved historical data that is displayed in the updated user interface; where the computer-executable instructions, when executed by the processor, further cause the processor to at least update the user interface to modify repeatedly the appearance of the graphical representation of the first physical component in accordance with the identified portion of the retrieved historical data and a current position of the slider along the slider bar at the speed defined by the one or more screen replay options; where the one or more screen replay options comprise at least one of a time span, a start time, a start date, a historical data replay interval, or a number of times per second that the slider moves along the slider bar; where the portion of the retrieved historical data that corresponds to the graphical representation of the first physical component comprises a first measurement captured at a first time and a second measurement captured at a second time, where the first time and the second time are before a current time and fall within a time span defined by the one or more screen replay options, and where the computer-executable instructions, when executed by the processor, further cause the processor to at least: update the user interface to modify the appearance of the graphical representation of the first physical component to visually depict the first measurement based on the slider being at a position along the slider bar that corresponds with the first time, and update the updated user interface to modify the modified appearance of the graphical representation of the first physical component to visually depict the second measurement based on the slider moving from the position along the slider bar that corresponds with the first time to a position along the slider bar that corresponds with the second time, where the slider moves from the position along the slider bar that corresponds with the first time to the position along the slider bar that corresponds with the second time at the speed defined by the one or more screen replay options; where the computer-executable instructions, when executed by the processor, further cause the processor to at least: process a selection of one or more second screen replay options received via the user interface, retrieve second historical data corresponding to the one or more second screen replay options, identify a portion of the retrieved second historical data that corresponds to the graphical representation of the first physical component, and update the user interface to display a first window and a second window, where an appearance of the graphical representation of the first physical component is repeatedly modified in the first window in accordance with the identified portion of the retrieved historical data that corresponds to the graphical representation of the first physical component at the speed defined by the one or more screen replay options, and where an appearance of the graphical representation of the first physical component is repeatedly modified in the second window in accordance with the identified portion of the retrieved second historical data that corresponds to the graphical representation of the first physical component at a speed defined by the one or more second screen replay options; where the updated user interface displays the first window and the second window concurrently; where the first window comprises a first slider that moves along a first slider bar to control the appearance of the graphical representation of the first physical component in the first window, where the second window comprises a second slider that moves along a second slider bar to control the appearance of the graphical representation of the first physical component in the second window, and where a movement of the first slider along the first slider bar is independent of a movement of the second slider along the second slider bar; where the computer-executable instructions, when executed by the processor, further cause the processor to at least update the user interface to display the first window, the second window, and a third window, where the third window depicts, for each physical component in the plurality of physical components, the graphical representation of the respective physical component and the current measurement associated with the respective physical component; where the updated user interface displays the first window, the second window, and the third window concurrently; where the computer-executable instructions, when executed by the processor, further cause the processor to at least: determine one or more second screen replay options based on an output of a trained artificial intelligence model, retrieve second historical data corresponding to the one or more second replay options at a time based on the output of the trained artificial intelligence model, and update the updated user interface to display an indication of the retrieved second historical data in response to a request to view a replay of data corresponding to the plurality of physical components; where the computer-executable instructions, when executed by the processor, further cause the processor to at least: retrieve keystroke data corresponding to the one or more screen replay options, and update the user interface to modify repeatedly an appearance of the graphical representation of the first physical component in accordance with the identified portion of the retrieved historical data that corresponds to the graphical representation of the first physical component and to display the retrieved keystroke data at a speed defined by the one or more screen replay options; and where the updated user interface comprises a graphical representation of a keyboard displayed concurrently with the graphical representation of the first physical component, and where an appearance of the graphical representation of the keyboard is modified repeatedly in accordance with the keystroke data at the speed defined by the one or more screen replay options.

Another aspect of the disclosure provides a computer-implemented method comprising: as implemented by a user device having one or more processors and memory, receiving a selection of one or more screen replay options via a user interface, where the user interface depicts, for each physical component in a plurality of physical components, a graphical representation of the respective physical component and a current measurement associated with the respective physical component; retrieving historical data corresponding to the one or more screen replay options; identifying a portion of the retrieved historical data that corresponds to the graphical representation of a first physical component in the plurality of physical components; and updating the user interface to modify repeatedly an appearance of the graphical representation of the first physical component in accordance with the identified portion of the retrieved historical data that corresponds to the graphical representation of the first physical component at a speed defined by the one or more screen replay options.

The computer-implemented method of the preceding paragraph can include any sub-combination of the following features: where the updated user interface comprises a slider configured to move along a slider bar, and where a position of the slider along the slider bar controls a portion of the portion of the retrieved historical data that is displayed in the updated user interface; where the portion of the retrieved historical data that corresponds to the graphical representation of the first physical component comprises a first measurement captured at a first time and a second measurement captured at a second time, where the first time and the second time are before a current time and fall within a time span defined by the one or more screen replay options, and where updating the user interface further comprises: updating the user interface to modify the appearance of the graphical representation of the first physical component to visually depict the first measurement based on the slider being at a position along the slider bar that corresponds with the first time, and updating the updated user interface to modify the modified appearance of the graphical representation of the first physical component to visually depict the second measurement based on the slider moving from the position along the slider bar that corresponds with the first time to a position along the slider bar that corresponds with the second time, where the slider moves from the position along the slider bar that corresponds with the first time to the position along the slider bar that corresponds with the second time at the speed defined by the one or more screen replay options; where the computer-implemented method further comprises: receiving a selection of one or more second screen replay options via the user interface, retrieving second historical data corresponding to the one or more second screen replay options, identifying a portion of the retrieved second historical data that corresponds to the graphical representation of the first physical component, and updating the user interface to display a first window and a second window, where an appearance of the graphical representation of the first physical component is repeatedly modified in the first window in accordance with the identified portion of the retrieved historical data that corresponds to the graphical representation of the first physical component at the speed defined by the one or more screen replay options, and where an appearance of the graphical representation of the first physical component is repeatedly modified in the second window in accordance with the identified portion of the retrieved second historical data that corresponds to the graphical representation of the first physical component at a speed defined by the one or more second screen replay options; and where updating the user interface further comprises: retrieving keystroke data corresponding to the one or more screen replay options, and updating the user interface to modify repeatedly an appearance of the graphical representation of the first physical component in accordance with the identified portion of the retrieved historical data that corresponds to the graphical representation of the first physical component and to display the retrieved keystroke data at a speed defined by the one or more screen replay options.

Another aspect of the disclosure provides non-transitory, computer-readable storage media comprising computer-executable instructions, where the computer-executable instructions, when executed by a processor, cause the processor to perform operations comprising: receiving a selection of one or more screen replay options via a user interface, where the user interface depicts, for each physical component in a plurality of physical components, a graphical representation of the respective physical component and a current measurement associated with the respective physical component; retrieving historical data corresponding to the one or more screen replay options; identifying a portion of the retrieved historical data that corresponds to the graphical representation of a first physical component in the plurality of physical components; and updating the user interface to modify repeatedly an appearance of the graphical representation of the first physical component in accordance with the identified portion of the retrieved historical data that corresponds to the graphical representation of the first physical component at a speed defined by the one or more screen replay options.

The non-transitory, computer-readable storage media of the preceding paragraph can include any sub-combination of the following features: where the updated user interface comprises a slider configured to move along a slider bar, where the portion of the retrieved historical data that corresponds to the graphical representation of the first physical component comprises a first measurement captured at a first time and a second measurement captured at a second time, where the first time and the second time are before a current time and fall within a time span defined by the one or more screen replay options, and where the processor further performs operations comprising: updating the user interface to modify the appearance of the graphical representation of the first physical component to visually depict the first measurement based on the slider being at a position along the slider bar that corresponds with the first time, and updating the updated user interface to modify the modified appearance of the graphical representation of the first physical component to visually depict the second measurement based on the slider moving from the position along the slider bar that corresponds with the first time to a position along the slider bar that corresponds with the second time, where the slider moves from the position along the slider bar that corresponds with the first time to the position along the slider bar that corresponds with the second time at the speed defined by the one or more screen replay options.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
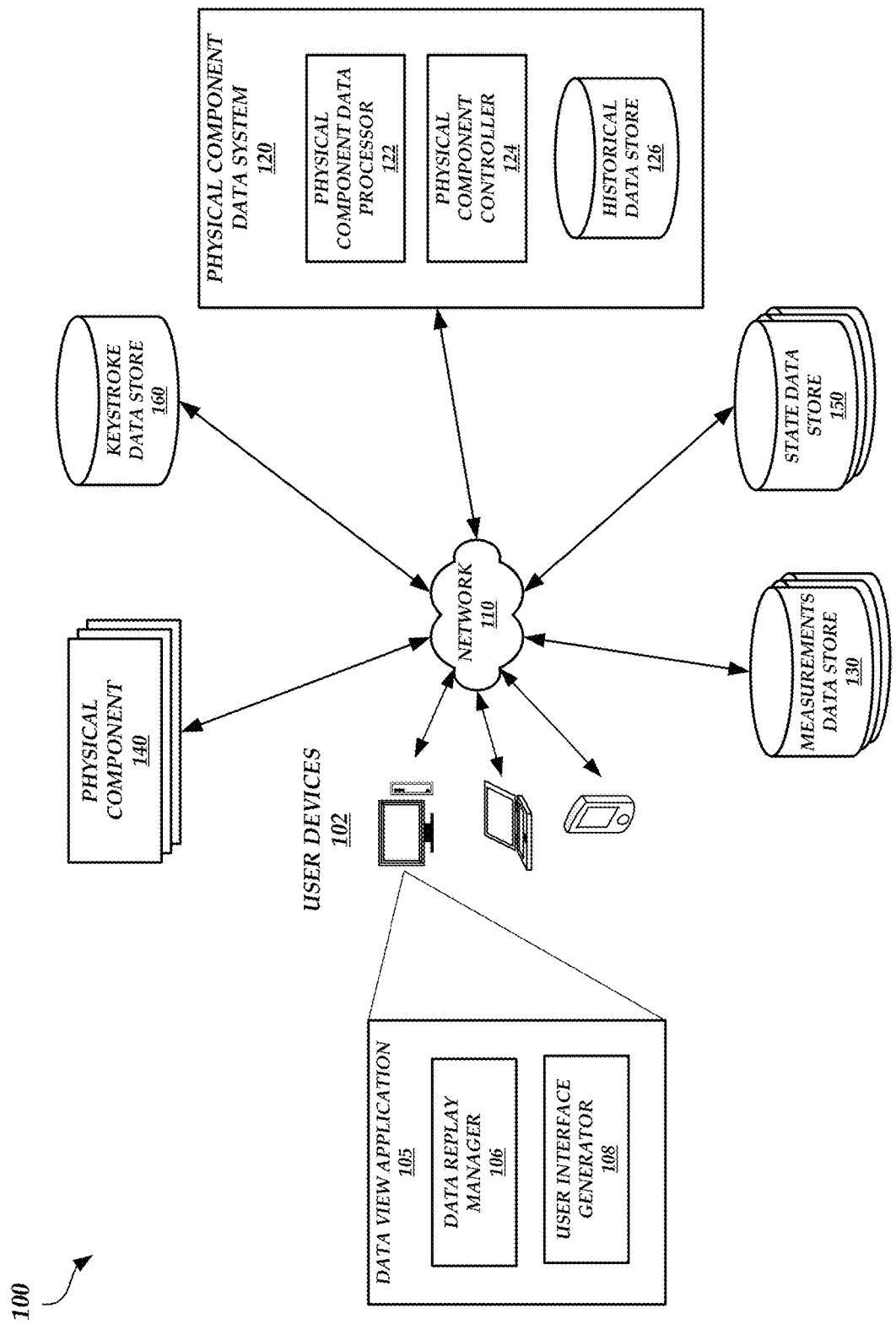
FIG. 1 is a block diagram of an illustrative operating environment in which a user device executes a data view application that allows an operator to replay historical data measured or captured by sensors associated with one or more physical components.

Introduction to an Improved Physical Control System User Interface

As described above, a typical physical control system, such as a SCADA system, can cause a user interface to display real-time data measured or captured by sensors associated with various physical components being monitored or controlled by the physical control system. The user interface may depict a graphical representation of the physical components being monitored or controlled and an indication of the real-time data measured or captured by sensors associated with some or all of the physical components. For example, if a pump is being monitored by a SCADA system, the user interface may depict a graphical representation of the pump and an indication of a real-time value of a parameter associated with the pump, such as a real-time value of liquid pressure within the pump, a real-time value of the volume of liquid passing through the pump per second or minute, and/or the like. The SCADA system may cause the user interface to update periodically as new real-time data is received. Thus, at any given time instant, the user interface may depict a current snapshot of a state of one or more physical components being monitored or controlled.

Generally, a typical physical control system and/or a user device displaying the user interface can store the received real-time data in a data store. The data stored in the data store may then be real-time data obtained by the physical control system at some previous time (e.g., historical data). A typical physical control system and/or the user device can later retrieve the historical data for diagnostic purposes. For example, an operator, using the typical physical control system and/or user device, may submit a request to view historical data. In response, a typical physical control system and/or user device causes a user interface to display a table of the historical data and/or a graph charting the historical data. Displaying a table or graph of the historical data can be problematic, however.

For example, the table of historical data may include rows corresponding to different physical components being controlled or monitored and columns corresponding to different time instants. Thus, each row may include values for a parameter associated with the physical component corresponding to the respective row. Alternatively, each column can correspond to a different physical component and each row may correspond to a different time instant. The historical data, however, can cover a long period of time. Given the volume of historical data that may be present and limitations in the size of the user interface (e.g., as defined by the physical display depicting the user interface), not all of the historical data may be immediately viewable within a single window or page and/or within an above-the-fold portion of the user interface (e.g., the portion of the user interface that is rendered and displayed first before a user performs any navigational steps, such as scrolling, selecting items or menus, selecting page numbers, browsing back and/or forward, etc.). Rather, the user interface may include a scroll bar or display different sets of historical data on different pages and/or in different windows. Thus, the operator may have to perform one or more additional navigational steps in order to view all of the historical data. As a result, it may be difficult for the operator to compare the values of a parameter corresponding to a physical component over a period of time, compare parameters corresponding to different physical components over a period of time, or otherwise analyze the historical data in an efficient manner to perform troubleshooting or other diagnostic tasks.

In fact, often a typical physical control system monitors, for a particular physical component, values for multiple parameters. In such a situation, a typical physical control system may generate individual tables for each physical component, where each table includes rows or columns corresponding to each individual parameter. Thus, the operator may have to open multiple windows or pages that each depict a different table to view historical data for different physical components. Accordingly, the generation of multiple tables may make it even more difficult for the operator to analyze the historical data and/or may involve the operator performing even more navigational steps just to view the historical data in its entirety.

Displaying the historical data in a graph format results in similar drawbacks. For example, given the volume of historical data that may be present and the size limitation of the user interface, the entire graph may not be completely viewable within a single window or page and a scroll bar may therefore be present (thus cause the operator to take additional navigational steps). One possible solution for removing the scroll bar may be to reduce the resolution of the graph by shrinking the size of the graph or downsampling the historical data (e.g., removing data values from the historical data in periodic increments). This solution is less than ideal given that a graph having a lower resolution may thwart any attempts to accurate identify anomalous or other problematic values that could indicate failures or other malfunctions in the physical components. For example, failures or other malfunctions may be indicated by certain parameters having certain values over a particular time period. If the resolution of the graph is lowered such that the time period between each displayed data value is greater than the particular time period during which anomalous values can occur, then there may be situations in which the graph fails to display the anomalous values (e.g., if the anomalous values occur during time instants other than the time instants displayed in the lower resolution graph). As a result, failures or other malfunctions in physical components may go undetected and can lead to additional physical component failures and/or malfunctions.

In addition, it may be difficult to display historical data corresponding to different physical components within a single graph. For example, the physical components being monitored may be of different types. Thus, the parameters that are measured or captured in association with each physical component may be different as well. As a result, it may be impractical or impossible to display the historical data for different physical components in a single graph if the types of historical data to be displayed is different for at least some of the physical components. Even if some historical data for different physical components could be displayed within a single graph, the historical data may overlap within the user interface and be distracting to the user.

Furthermore, displaying a table or graph of the historical data may provide an incomplete picture of actions taken at or near the time that the historical data was measured or captured. For example, as the historical data was being received in real-time, an operator may have viewed the data and taken actions via the physical control system based on the viewed data. Such actions could include changing the status of a physical component (e.g., turning the physical component on, turning the physical component off, transitioning the state of the physical component, etc.), transmitting an alert to another operator or device, selecting a particular physical component to view additional information, instructing a physical component to perform an action (e.g., instructing a physical component to adjust a flow rate, instructing a physical component to adjust a pressure, instructing a physical component to drain a liquid, instructing a physical component to store a liquid, etc.). Having the ability to review actions taken by an operator in response to received historical data could aid a physical control system diagnostic process to identify errors, malfunctions, or other issues. Typical physical control systems and/or user devices, however, provide no user interface or other mechanism for reviewing and/or displaying operator actions, alone or in combination with the display of historical data.

Finally, simply displaying a table or graph of the historical data may be inadequate in allowing an operator to identify operational issues due to the spatial limitations of a table or graph. Often, physical components may be grouped together in the user interface by geographic location. An operator can therefore compare the operation of physical components located in the same geographic location and/or compare the operation of physical components located in different geographic locations. While the table or graph may display the historical data, the table or graph has no ability to depict the historical data by geography or to otherwise indicate the geographic relationships of the historical data. A typical physical control system and/or user device could generate different tables or graphs for physical components associated with a particular geographic location, but then this would involve the operator performing additional navigational steps to view different tables or graphs in different windows or pages in order to perform a meaningful comparison. Typical physical control systems and/or user devices therefore provide no user interface or other mechanism for compactly and efficiently indicating a geographic relationship of the physical components and/or associated historical data.

Accordingly, described herein is an improved physical control system environment that allows an operator to replay historical data in a user interface that depicts content as if the data being displayed in the user interface is being captured or measured in real-time. For example, the improved physical control system environment can produce an improved user interface that depicts graphical representation(s) of one or more physical components optionally arranged by geography, similar to the graphical representation(s) that are depicted by a physical control system user interface that displays real-time data. However, the underlying data depicted in the improved user interface may be historical data rather than real-time data. The improved user interface may display the historical data in association with the appropriate physical component graphical representation(s), with the appearance of the graphical representation(s) changing in size, shape, color, or other form based on the historical data. The historical data depicted in the improved user interface may be data captured or measured in association with a particular period of time, and the improved user interface can replay the historical data at a speed that matches the particular period of time or that is different than the particular period of time.

Thus, the improved user interface can depict the historical data within a single window or page, thereby reducing the number of navigational steps performed by an operator to see the historical data in its entirety. Furthermore, the improved user interface can depict the historical data in its entirety without having to reduce the resolution of the historical data requested by an operator. Thus, the improved user interface can improve the likelihood that anomalous values are identified, thereby improving the likelihood that physical component malfunctions or failures are identified and addressed. Furthermore, the improved user interface can depict the geographic relationships of the physical component(s) and/or associated historical data, which can reduce the number of navigational steps taken by an operator to perform a diagnostic review of the physical control system and/or improve the accuracy and/or effectiveness of any diagnostic review that is performed.

Optionally, the improved user interface can depict operator actions concurrently with the display of the graphical representation(s) of the physical component(s) and the historical data. For example, the improved user interface may depict keystrokes, mouse actions, pop-up windows, etc. that appeared when the historical data was being displayed (or could have been displayed) in real-time as the data was captured or measured. By concurrently depicting operator actions with the historical data, the improved user interface can improve the accuracy of any diagnostic processes being performed and/or can function as an educational tool to teach operators actions that should or should not be performed. As a result, the features provided by the improved user interface can improve operator performance, and therefore improve the reliability of the physical control system itself.

While the following figures and description are described herein with respect to SCADA systems and physical components such as water tanks, pumps, and valves, this is not meant to be limiting. The features and operations described herein as being performed by a SCADA system or user device (including the generation, render, and display of the improved user interface described herein) can be performed in association with data obtained by any physical control system that is used to monitor or control any type of physical component. In fact, the data replay features of the improved user interface described herein can be implemented in any type of user interface used to depict historical data.

The foregoing aspects and many of the attendant advantages of this disclosure will become more readily appreciated as the same become better understood by reference to the following detailed description, when taken in conjunction with the accompanying drawings Example Historical Data Replay Environment FIG. 1 is a block diagram of an illustrative operating environment 100 in which a user device 102 executes a data view application 105 that allows an operator to replay historical data measured or captured by sensors associated with one or more physical components 140. The operating environment 100 further includes a physical component data system 120, one or more measurements data stores 130, one or more state data stores 150, and a keystroke data store 160 that may each communicate with one or more user devices 102 and/or one or more physical components 140 via a network 110.

The physical component data system 120 can be a computing system having memory storing computer-executable instructions and one or more hardware processors in communication with the memory, where the computer-executable instructions, when executed by the one or more hardware processors, cause the hardware processor(s) to obtain, store, and/or process data measured or captured by sensors associated with the physical component(s) 140, and/or to control operation of the physical component(s) 140. The physical component data system 120 may be a single computing device, or it may include multiple distinct computing devices, such as computer servers, logically or physically grouped together to collectively operate as a server system. The components of the physical component data system 120 can each be implemented in application-specific hardware (e.g., a server computing device with one or more ASICs) such that no software is necessary, or as a combination of hardware and software. In addition, the modules and components of the physical component data system 120 can be combined on one server computing device or separated individually or into groups on several server computing devices. In some embodiments, the physical component data system 120 may include additional or fewer components than illustrated in FIG. 1.

In some embodiments, the features and services provided by the physical component data system 120 may be implemented as web services consumable via the communication network 110. In further embodiments, the physical component data system 120 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The physical component data system 120 may be a physical control system, such as a SCADA system, that can monitor and/or control the physical component(s) 140. For example, an operator can access the physical component data system 120 directly to monitor and/or control the physical component(s) 140. Alternatively or in addition, an operator can access the physical component data system 120 indirectly via a user device 102 to monitor and/or control the physical component(s) 140. The physical component data system 120 can monitor the physical component(s) 140 by obtaining, storing, and/or processing data measured or captured by one or more physical sensors attached to, coupled with, embedded within, or otherwise associated with one or more of the physical components 140 via the network 110. Similarly, the physical component data system 120 can control the physical component(s) 140 by transmitting executable instruction(s) to the physical component(s) 140 via the network 110. An executable instruction, when executed by a physical component 140, may cause the physical component 140 to perform an action (e.g., change a state of the physical component 140 (e.g., on, off, standby, etc.), change operation of the physical component 140 (e.g., increase pressure, decrease pressure, increase flow rate, decrease flow rate, increase a liquid storage level, decrease a liquid storage level, etc.), sound an alarm, cause a change to the operation of another physical component 140, etc.) in accordance with the provided instruction.

The physical component data system 120 may include various modules, components, data stores, and/or the like to provide the physical component 140 monitor and control functionality described herein. For example, the physical component data system 120 may include a physical component data processor 122, a physical component controller 124, and a historical data store 126.

The physical component data processor 122 can obtain data measured or captured by sensor(s) attached to, coupled with, embedded within, or otherwise associated with the physical component(s) 140 directly from the sensor(s) via the network 110 or indirectly from the measurements data store(s) 130 and/or state data store(s) 150 via the network 110. For example, data measured or captured by a sensor associated with a physical component 140 may be transmitted by the sensor to the physical component data processor 122 and/or to one of a measurements data store 130 or a state data store 150. Specifically, a sensor may transmit measured or captured data to a measurements data store 130 if the data measured or captured is an alphanumeric value that represents the value of a physical parameter. As an illustrative example, a physical parameter may include a flow rate, a pressure level, a liquid height level, a current storage level, an impedance value, a power level, and/or the like. A sensor may transmit measured or captured data to a state data store 150 if the data measured or captured represents a current state of the physical component 140, such as whether the physical component is on, off, enabled, disabled, on standby, in a low power state, transitioning from one state to another, in an error or malfunctioning state, etc. In some embodiments, the measured or captured data is pushed to the physical component data processor 122. In other embodiments, the measured or captured data is pulled from the physical component(s) 140, measurements data store(s) 130, and/or state data store(s) 150 (e.g., by the physical component data processor 122). The physical component data processor 122 can obtain the data in real-time (e.g., within 10 ms, 100 ms, 500 ms, etc. of when the data is measured or captured by the sensor(s)) or in near real-time (e.g., within 1 minute, 5 minutes, 10 minutes, etc. of when the data is measured or captured by the sensor(s)).

The physical component data processor 122 can store obtained data in the historical data store 126, such as in an entry associated with the physical component 140 from which the data is obtained and/or a timestamp indicating a time at which the data is obtained, measured, or captured. Optionally, the physical component data processor 122 can process some or all of the data prior to storing the data in the historical data store 126. For example, a sensor may return raw data. The physical component data system 120 can filter, aggregate, transform, or otherwise modify the raw data (e.g., to remove noise, incomplete data, undesirable data, etc.), and store the modified data in the historical data store 126.

The physical component controller 124 can generate and transmit instructions to the physical component(s) 140 via the network 110. For example, an instruction generated by the physical component controller 124 can instruct a physical component 140 to perform an action (e.g., change a state of the physical component 140 (e.g., on, off, standby, etc.), change operation of the physical component 140 (e.g., increase pressure, decrease pressure, increase flow rate, decrease flow rate, increase a liquid storage level, decrease a liquid storage level, etc.), sound an alarm, cause a change to the operation of another physical component 140, etc.). The physical component controller 124 can generate and/or transmit the instruction automatically (e.g., in response to the physical component data processor 122 receiving a certain value for a parameter from a sensor, measurement data store 130, and/or state data store 150, periodically, etc.) and/or in response to an instruction received from an operator directly or indirectly via a user device 102.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., data view application 105) that allows an operator to view real-time physical component 140 data, control operation of the physical component(s) 140, and/or to view a replay of real-time physical component 140 data (e.g., view or play historical physical component 140 data). A user device 102 can be operated by an owner or operator of some or all of the physical component(s) 140.

In some embodiments, a user device 102 may run an application (e.g., the data view application 105 or another application) that allows the user device 102 to itself function as a physical control system, such as a SCADA system. In other embodiments, a user device 102 may run an application (e.g., the data view application 105 or another application) that provides an operator with access to the physical control system and that allows the operator to control the physical control system via the application.

As described herein, the data view application 105 may allow an operator to view real-time or near real-time data. For example, a user interface generator 108 of the data view application 105 can obtain real-time or near real-time data from one or more of the measurements data stores 130, one or more of the state data stores 150, the historical data store 126, and/or directly from one or more physical components 140. Once obtained, the user interface generator can render and display on the user device 102 a real-time data user interface that depicts a graphical representation of one or more of the physical component(s) 140 and the real-time data that is obtained. The user interface generator 108 can continue to update the real-time data user interface as new real-time data is obtained. Thus, the real-time data user interface may visually depict a current view of the status of one or more of the physical components 140. This real-time data user interface is described in greater detail below with respect to FIG. 2.

To provide the replay functionality described herein, the data view application 105 can obtain historical data (e.g., data measured or captured by a sensor attached to, coupled with, embedded within, or otherwise associated with a physical component 140 some time before a current time, such as at least 1 minute before a current time, at least 5 minutes before a current time, at least 1 hour before a current time, at least 24 hours before a current time, at least 7 days before a current time, etc.) from one or more of the measurements data stores 130, one or more of the state data stores 150, the historical data store 126, and/or directly from one or more physical components 140. In particular, a data replay manager 106 of the data view application 105 can prompt an operator to select a time range and/or interval of historical data to obtain in response to the operator selecting an option to view a replay of historical data. The data replay manager 106 can then obtain the historical data that meets the criteria selected by the operator.

The user interface generator 108 can then render and display on the user device 102 a historical data user interface that depicts a graphical representation of one or more of the physical component(s) 140. This historical data user interface may be similar to the real-time data user interface. In particular, the graphical representation(s) depicted in the historical data user interface may appear identical to the graphical representation(s) depicted in the real-time data user interface. However, the historical data user interface may not display real-time data in association with the graphical representation(s). Rather, the historical data user interface may include playback controls, an adjustable slider, and an indication of a time associated with a position of the slider. The historical data user interface may initially depict historical data in association with the graphical representation(s) that was measured or captured at the time indicated in the historical data user interface. Using the playback controls, an operator can play or step forward the historical data, which may cause the slider to move forward one position, the indicated time to update per the new slider position, and the historical data to update such that the historical data user interface now depicts historical data in association with the graphical representation(s) that was measured or captured at the updated time. Alternatively or in addition, the historical data user interface may automatically play or step forward the historical data, such as at a speed or rate previously specified by the operator. The historical data can continue to be played or stepped forward automatically or manually, with the historical data depicted in the historical data user interface being updated accordingly.

The historical data user interface can therefore play and display the historical data as if the data was being obtained in real-time, but at a speed specified by the operator. In other words, because the historical data user interface displays the historical data in association with the graphical representation(s), the information displayed in the historical data user interface may appear to be a real-time or current representation of the status of one or more physical components 140. As a result, the historical data user interface can display historical data corresponding to different physical components 140 within a single view and in a manner that immediately indicates to a viewer a geographical relationship between the physical components 140 and corresponding historical data without having to reduce the resolution of or otherwise modify the historical data. Accordingly, the historical data user interface can reduce the number of navigational steps taken by an operator or other viewer to view the historical data in its entirety, no matter the volume of historical data that is retrieved for display. The historical data user interface therefore enables an operator to accurately and efficiently identify anomalous values and ultimately resolve physical component 140 errors, failures, and/or malfunctions. Additional details of the historical data user interface are described below with respect to FIGS. 3 through 4C.

The physical component(s) 140 may be part(s), structure(s), physical device(s), and/or other types of component(s) that perform a physical action to control critical infrastructure (e.g., water treatment plants, wastewater collection systems, power plants or other electrical power generation systems, electric power transmission systems, oil and/or gas distribution systems, telecommunications systems, etc.), industrial processes (e.g., manufacturing systems, fabrication systems, etc.), and/or operations of other facilities (e.g., buildings, transportation hubs, warehouses, etc.). As an illustrative example, a physical component 140 can include a liquid tank (e.g., a water tank); a pump; a valve; a generator; a cooling tower; a transformer; a turbine; a boiler; a condenser; a heater; a chimney stack, a laser, a dish, a lens, a vacuum chamber, a substrate, a heating, ventilation, and air conditioning (HVAC) unit; a robotic arm; an alarm; mains water; a gas line; a pipeline; and/or the like.

The measurements data store(s) 130 can each store physical parameter values measured or captured by one or more sensors associated with one or more physical components 140. Each measurement data store 130 may be located in the same geographic region and/or in different geographic regions. While the measurements data store(s) 130 are illustrated as being external to the user devices 102 and the physical component data system 120, this is not meant to be limiting. For example, not shown, the measurements data store(s) 130 can be internal to a user device 102 and/or the physical component data system 120.

The state data store(s) 150 can each store state information measured or captured by one or more sensors associated with one or more physical components 140. Each state data store 150 may be located in the same geographic region and/or in different geographic regions. While the state data store(s) 150 are illustrated as being external to the user devices 102 and the physical component data system 120, this is not meant to be limiting. For example, not shown, the state data store(s) 150 can be internal to a user device 102 and/or the physical component data system 120.

The keystroke data store 160 can store keystroke data captured by one or more user devices 102. As explained in greater detail below, the data view application 105 can retrieve some or all of the keystroke data to replay, visually, actions or other navigational steps performed by an operator via the data view application 105 while real-time data was being depicted. While the keystroke data store 160 is illustrated as being external to the user devices 102 and the physical component data system 120, this is not meant to be limiting. For example, not shown, the keystroke data store 160 can be internal to a user device 102 and/or the physical component data system 120.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example User Interfaces

Figure 2:
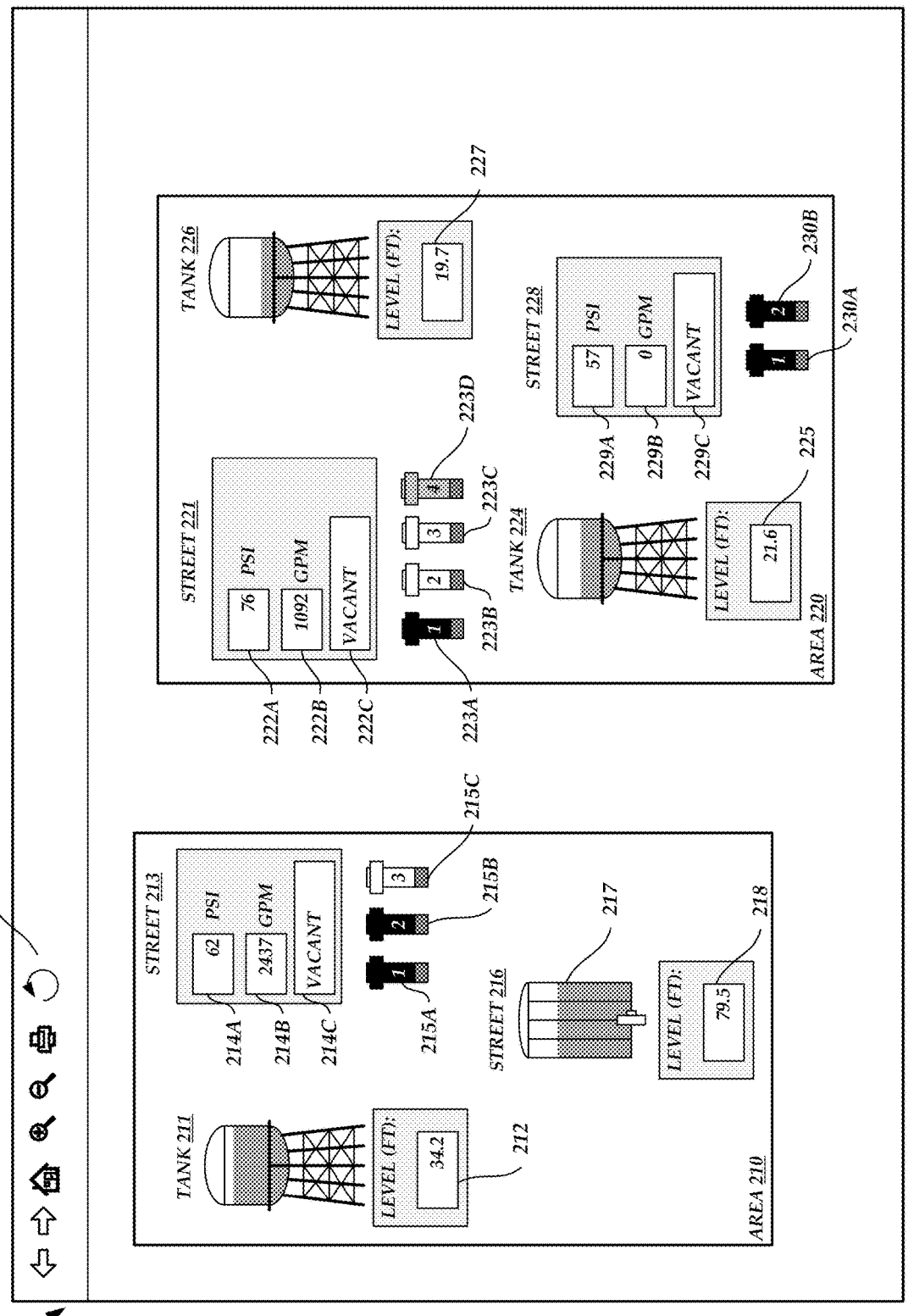
FIG. 2 illustrates an example real-time data user interface in which real-time data is depicted.

FIG. 2 illustrates an example real-time data user interface 200 in which real-time data is depicted. The real-time data user interface 200 may be rendered and/or displayed on a user device 102. For example, the data view application 105 may cause the real-time data user interface 200 to be rendered and displayed. As illustrated in FIG. 2, the real-time data user interface 200 includes various controls in a top portion of the real-time data user interface 200 and graphical representations of various physical components 140 in a main portion of the real-time data user interface 200.

For example, the main portion of the real-time data user interface 200 depicts graphical representations of physical components 140 present in areas 210 and 220. Area 210 may be a specific geographic location or region and includes tank 211, street 213, and street 216. The tank 211 may hold a liquid (e.g., water) and a sensor associated with the tank 211 may measure a height of the stored liquid. The real-time data user interface 200 may depict, in text field 212, a current measured height of the liquid stored in the tank 211, which may be 34.2 feet at a current time. The measured height indicated in the text field 212 may update automatically as new values are received by the data view application 105 directly or indirectly from the sensor associated with the tank 211.

In addition, an appearance of the graphical representation of the tank 211 may update dynamically based on received tank 211 measured liquid height values. For example, the graphical representation of the tank 211 may graphically represent the current measured height of the liquid stored in the tank 211 (e.g., via the shaded portion depicted within the tank 211). As new height values are received, the portion of the graphical representation of the tank 211 that represents the current measured height of the liquid stored in the tank 211 may change automatically to reflect a current height value. For example, the graphical representation of the tank 211 can be partly or fully shaded, where the shaded portion (and/or the percentage of the graphical representation of the tank 211 that is shaded) indicates a current measured height of the liquid stored in the tank 211. As another example, the graphical representation of the tank 211 can change shape, color, form, size, and/or another visual characteristic to indicate a current measured height of the liquid stored in the tank 211. As an illustrative example and as depicted in FIG. 2, the graphical representation of the tank 211 may be shaded to indicate a current measured height of the liquid stored in the tank 211. If the height value increases from a first value to a second value, the portion of the graphical representation of the tank 211 that is shaded may increase as well, proportional to the increase in the height value. Similarly, if the height value decreases from a first value to a second value, the portion of the graphical representation of the tank 211 that is shaded may decrease as well, proportional to the decrease in the height value. Thus, the current height of liquid stored in the tank 211 may be represented numerically in the text field 212 and graphically via an appearance of the graphical representation of the tank 211.

The street 213 may be a location at which pumps 215A-C are located. One or more sensors associated with one or more of the pumps 215A-C can measure a pressure of liquid or gas flowing through the pumps 215A-C (e.g., in PSI), a flow rate of liquid or gas flowing through the pumps 215A-C (e.g., in gallons per minute), and/or an indication of a vacancy of the pumps 215A-C. The data view application 105 can continuously or periodically obtain real-time values for the pressure, flow rate, and/or vacancy and cause the real-time data user interface 200 to depict such information. For example, text field 214A may indicate the pressure (e.g., 62 PSI), text field 214B may indicate the flow rate (e.g., 2437 gallons per minute), and text field 214C may indicate the vacancy (e.g., vacant).

The appearance of the graphical representations of the pumps 215A-C may also update dynamically based on measured or captured pump states. For example, the sensor(s) that measure or captured the pressure, flow rate, and/or vacancy and/or other sensor(s) associated with the pumps 215A-C may measure or capture a current state of the pumps 215A-C. For example, a pump 215A-C may be on, off, transitioning from one state to another, or in an error state. An appearance of a graphical representation of a pump 215A-C may change shape, color, form, size, and/or another visual characteristic to indicate a current state of the pump 215A-C per information received from the appropriate sensor. As illustrated in FIG. 2, the data view application 105 may have received information indicating that the pump 215A is off. Thus, the data view application 105 may cause the real-time data user interface 200 to color the graphical representation of the pump 215A black to indicate that the pump 215A is currently off. Similarly, the data view application 105 may have received information indicating that the pump 215B is off and the pump 215C is on. As a result, the data view application 105 may cause the real-time data user interface 200 to color the graphical representation of the pump 215B black to indicate that the pump 215B is currently off and to color the graphical representation of the pump 215C white to indicate that the pump 215C is currently on. The data view application 105 may cause the real-time data user interface 200 to change an appearance of the graphical representation of one or more of the pumps 215A-C if, for example, new information is received indicating that the respective pump(s) 215A-C have changed state.

The street 216 may be a location at which another tank 217 is located. The tank 217 may hold a liquid (e.g., water) and a sensor associated with the tank 217 may measure a height of the stored liquid. The real-time data user interface 200 may depict, in text field 218, a current measured height of the liquid stored in the tank 217, which may be 79.5 feet at a current time. The measured height indicated in the text field 218 may update automatically as new values are received by the data view application 105 directly or indirectly from the sensor associated with the tank 217.

In addition, an appearance of the graphical representation of the tank 217 may update dynamically based on received tank 217 measured liquid height values. For example, the graphical representation of the tank 217 may graphically represent the current measured height of the liquid stored in the tank 217 (e.g., via the shaded portion depicted within the tank 217). As new height values are received, the portion of the graphical representation of the tank 217 that represents the current measured height of the liquid stored in the tank 217 may change automatically to reflect a current height value. For example, the graphical representation of the tank 217 can be partly or fully shaded, where the shaded portion (and/or the percentage of the graphical representation of the tank 217 that is shaded) indicates a current measured height of the liquid stored in the tank 217. As another example, the graphical representation of the tank 217 can change shape, color, form, size, and/or another visual characteristic to indicate a current measured height of the liquid stored in the tank 217. As an illustrative example and as depicted in FIG. 2, the graphical representation of the tank 217 may be shaded to indicate a current measured height of the liquid stored in the tank 217. If the height value increases from a first value to a second value, the portion of the graphical representation of the tank 217 that is shaded may increase as well, proportional to the increase in the height value. Similarly, if the height value decreases from a first value to a second value, the portion of the graphical representation of the tank 217 that is shaded may decrease as well, proportional to the decrease in the height value. Thus, the current height of liquid stored in the tank 217 may be represented numerically in the text field 218 and graphically via an appearance of the graphical representation of the tank 217.

Area 220 may be a specific geographic location or region and includes street 221, tank 224, tank 226, and street 228. The street 221 may be a location at which pumps 223A-D are located. One or more sensors associated with one or more of the pumps 223A-D can measure a pressure of liquid or gas flowing through the pumps 223A-D (e.g., in PSI), a flow rate of liquid or gas flowing through the pumps 223A-D (e.g., in gallons per minute), and/or an indication of a vacancy of the pumps 223A-D. The data view application 105 can continuously or periodically obtain real-time values for the pressure, flow rate, and/or vacancy and cause the real-time data user interface 200 to depict such information. For example, text field 222A may indicate the pressure (e.g., 76 PSI), text field 222B may indicate the flow rate (e.g., 1092 gallons per minute), and text field 222C may indicate the vacancy (e.g., vacant).

The appearance of the graphical representations of the pumps 223A-D may also update dynamically based on measured or captured pump states. For example, the sensor(s) that measure or captured the pressure, flow rate, and/or vacancy and/or other sensor(s) associated with the pumps 223A-D may measure or capture a current state of the pumps 223A-D. For example, a pump 223A-D may be on, off, transitioning from one state to another, or in an error state. An appearance of a graphical representation of a pump 223A-D may change shape, color, form, size, and/or another visual characteristic to indicate a current state of the pump 223A-D per information received from the appropriate sensor. As illustrated in FIG. 2, the data view application 105 may have received information indicating that the pump 223A is off. Thus, the data view application 105 may cause the real-time data user interface 200 to color the graphical representation of the pump 223A black to indicate that the pump 223A is currently off. Similarly, the data view application 105 may have received information indicating that the pump 223B is on, the pump 223C is on, and the pump 223D is transitioning states. As a result, the data view application 105 may cause the real-time data user interface 200 to color the graphical representation of the pump 223B white to indicate that the pump 223B is currently on, to color the graphical representation of the pump 223C white to indicate that the pump 223C is currently on, and to color the graphical representation of the pump 223D gray to indicate that the pump 223D is currently transitioning states (e.g., from on to off, from off to on, from off to an error state, from on to an error state, from an error state to on, from an error state to off, etc.). The data view application 105 may cause the real-time data user interface 200 to change an appearance of the graphical representation of one or more of the pumps 223A-D if, for example, new information is received indicating that the respective pump(s) 223A-D have changed state.

The tank 224 may hold a liquid (e.g., water) and a sensor associated with the tank 224 may measure a height of the stored liquid. The real-time data user interface 200 may depict, in text field 225, a current measured height of the liquid stored in the tank 224, which may be 21.6 feet at a current time. The measured height indicated in the text field 225 may update automatically as new values are received by the data view application 105 directly or indirectly from the sensor associated with the tank 224.

In addition, an appearance of the graphical representation of the tank 224 may update dynamically based on received tank 224 measured liquid height values. For example, the graphical representation of the tank 224 may graphically represent the current measured height of the liquid stored in the tank 224 (e.g., via the shaded portion depicted within the tank 224). As new height values are received, the portion of the graphical representation of the tank 224 that represents the current measured height of the liquid stored in the tank 224 may change automatically to reflect a current height value. For example, the graphical representation of the tank 224 can be partly or fully shaded, where the shaded portion (and/or the percentage of the graphical representation of the tank 224 that is shaded) indicates a current measured height of the liquid stored in the tank 224. As another example, the graphical representation of the tank 224 can change shape, color, form, size, and/or another visual characteristic to indicate a current measured height of the liquid stored in the tank 224. As an illustrative example and as depicted in FIG. 2, the graphical representation of the tank 224 may be shaded to indicate a current measured height of the liquid stored in the tank 224. If the height value increases from a first value to a second value, the portion of the graphical representation of the tank 224 that is shaded may increase as well, proportional to the increase in the height value. Similarly, if the height value decreases from a first value to a second value, the portion of the graphical representation of the tank 224 that is shaded may decrease as well, proportional to the decrease in the height value. Thus, the current height of liquid stored in the tank 224 may be represented numerically in the text field 225 and graphically via an appearance of the graphical representation of the tank 224.

The tank 226 may hold a liquid (e.g., water) and a sensor associated with the tank 226 may measure a height of the stored liquid. The real-time data user interface 200 may depict, in text field 227, a current measured height of the liquid stored in the tank 225, which may be 19.7 feet at a current time. The measured height indicated in the text field 227 may update automatically as new values are received by the data view application 105 directly or indirectly from the sensor associated with the tank 226.

In addition, an appearance of the graphical representation of the tank 226 may update dynamically based on received tank 226 measured liquid height values. For example, the graphical representation of the tank 226 may graphically represent the current measured height of the liquid stored in the tank 226 (e.g., via the shaded portion depicted within the tank 226). As new height values are received, the portion of the graphical representation of the tank 226 that represents the current measured height of the liquid stored in the tank 226 may change automatically to reflect a current height value. For example, the graphical representation of the tank 226 can be partly or fully shaded, where the shaded portion (and/or the percentage of the graphical representation of the tank 226 that is shaded) indicates a current measured height of the liquid stored in the tank 226. As another example, the graphical representation of the tank 226 can change shape, color, form, size, and/or another visual characteristic to indicate a current measured height of the liquid stored in the tank 226. As an illustrative example and as depicted in FIG. 2, the graphical representation of the tank 226 may be shaded to indicate a current measured height of the liquid stored in the tank 226. If the height value increases from a first value to a second value, the portion of the graphical representation of the tank 226 that is shaded may increase as well, proportional to the increase in the height value. Similarly, if the height value decreases from a first value to a second value, the portion of the graphical representation of the tank 226 that is shaded may decrease as well, proportional to the decrease in the height value. Thus, the current height of liquid stored in the tank 226 may be represented numerically in the text field 227 and graphically via an appearance of the graphical representation of the tank 226.

The street 228 may be a location at which pumps 230A-B are located. One or more sensors associated with one or more of the pumps 230A-B can measure a pressure of liquid or gas flowing through the pumps 230A-B (e.g., in PSI), a flow rate of liquid or gas flowing through the pumps 230A-B (e.g., in gallons per minute), and/or an indication of a vacancy of the pumps 230A-B. The data view application 105 can continuously or periodically obtain real-time values for the pressure, flow rate, and/or vacancy and cause the real-time data user interface 200 to depict such information. For example, text field 229A may indicate the pressure (e.g., 57 PSI), text field 229B may indicate the flow rate (e.g., 0 gallons per minute), and text field 229C may indicate the vacancy (e.g., vacant).

The appearance of the graphical representations of the pumps 230A-B may also update dynamically based on measured or captured pump states. For example, the sensor(s) that measure or captured the pressure, flow rate, and/or vacancy and/or other sensor(s) associated with the pumps 230A-B may measure or capture a current state of the pumps 230A-B. For example, a pump 230A-B may be on, off, transitioning from one state to another, or in an error state. An appearance of a graphical representation of a pump 230A-B may change shape, color, form, size, and/or another visual characteristic to indicate a current state of the pump 230A-B per information received from the appropriate sensor. As illustrated in FIG. 2, the data view application 105 may have received information indicating that the pump 230A is off. Thus, the data view application 105 may cause the real-time data user interface 200 to color the graphical representation of the pump 230A black to indicate that the pump 230A is currently off. Similarly, the data view application 105 may have received information indicating that the pump 230B is off. As a result, the data view application 105 may cause the real-time data user interface 200 to color the graphical representation of the pump 230B black to indicate that the pump 230B is currently off. The data view application 105 may cause the real-time data user interface 200 to change an appearance of the graphical representation of one or more of the pumps 230A-B if, for example, new information is received indicating that the respective pump(s) 230A-B have changed state.

In some embodiments, the appearance of the graphical representations of the tanks 211, 216, 224, and 226 may be normalized or displayed consistently such that a visual inspection of the graphical representations is sufficient to determine an approximate height of the liquid stored therein, even if the numerical values in the text fields 212, 218, 225, and/or 227 are not displayed. For example, a majority of the graphical representation of the tank 211 is shaded, which may indicate that the tank 211 is nearly full. On the other hand, a majority of the graphical representation of the tank 226 is not shaded, which may indicate that the tank 226 is nearly empty and has less liquid stored than the tank 211. The numerical values in the text fields 212 and 227 confirm that at least the amount or height of the liquid stored in the tank 226 is less than the amount or height of the liquid stored in the tank 211.

To update the real-time data user interface 200 accurately, the data view application 105 may associate an identifier with each dynamically updatable element in the real-time data user interface 200. For example, a dynamically updatable element in the real-time data user interface 200 may include an appearance of the graphical representation of the tank 211, the text field 212, the text fields 214A-C, an appearance of the graphical representation of the pump 215A, an appearance of the graphical representation of the pump 215B, an appearance of the graphical representation of the pump 215C, an appearance of the graphical representation of the tank 217, the text field 218, the text fields 222A-C, an appearance of the graphical representation of the pump 223A, an appearance of the graphical representation of the pump 223B, an appearance of the graphical representation of the pump 223C, an appearance of the graphical representation of the pump 223D, an appearance of the graphical representation of the tank 224, the text field 225, an appearance of the graphical representation of the tank 226, the text field 227, the text fields 229A-C, an appearance of the graphical representation of the pump 230A, and/or an appearance of the graphical representation of the pump 230B. The sensor that measures or captures a value or state may tag or associate the value or state with an identifier that matches or that is mapped to an identifier associated with a dynamically updatable element. Alternatively or in addition, the measurements data store(s) 130, the physical component(s) 140, the state data store(s) 150, and/or the physical component data system 120 can perform the tagging. The data view application 105 may store a mapping between identifiers and/or a mapping between identifiers and dynamically updatable elements. When the data view application 105 receives a new value or state and associated or tagged identifier, the data view application 105 can use the mapping(s) to identify the dynamically updatable element identifier mapped to the received identifier and/or the dynamically updatable element mapped to the dynamically updatable element identifier or received identifier. Once the dynamically updatable element is identified, the data view application 105 (e.g., the user interface generator 108) can cause the identified dynamically updatable element depicted in the real-time data user interface 200 to update in accordance with the received value or state.

Figure 3:
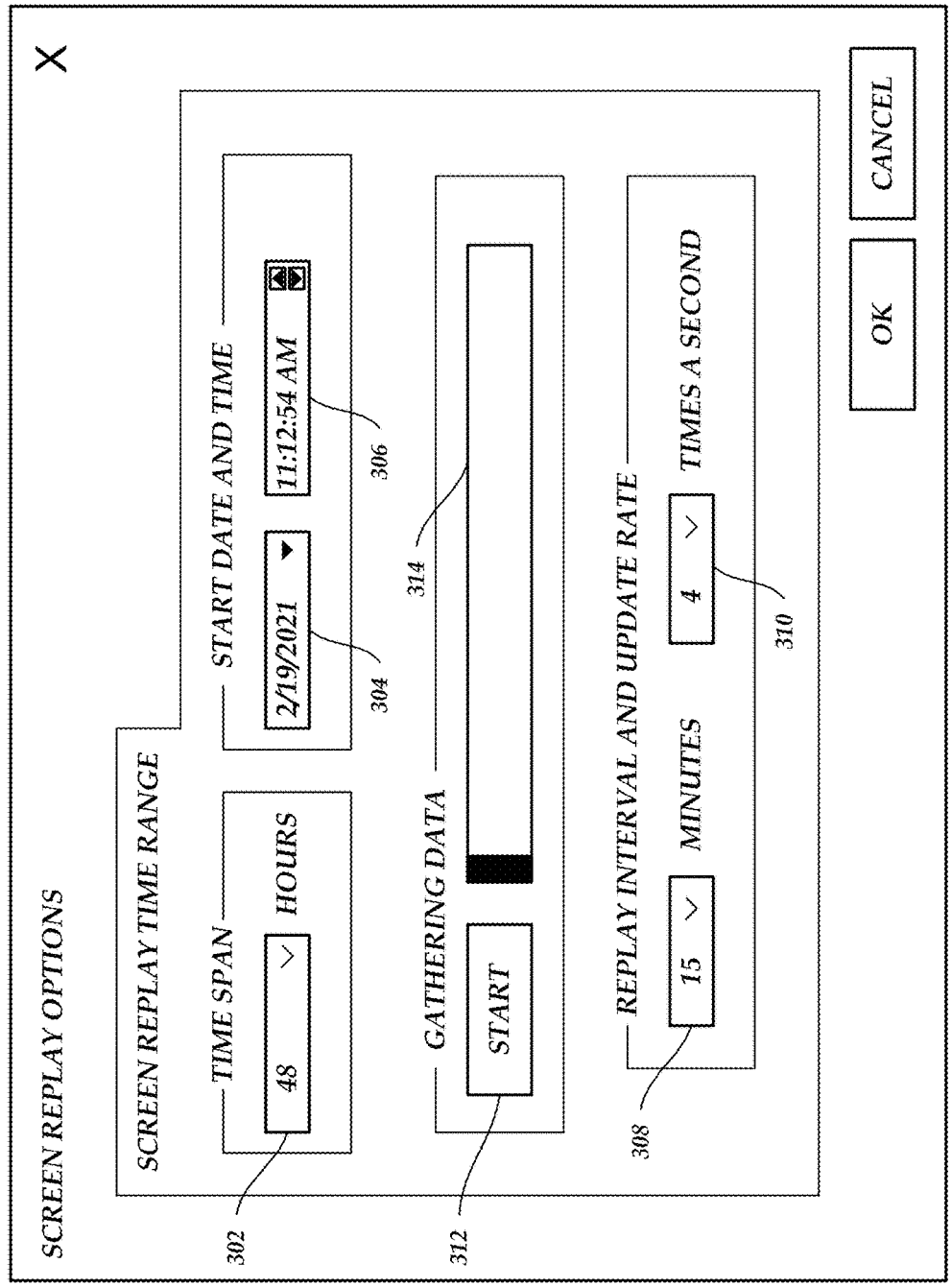
FIG. 3 illustrates an example screen replay options window.

The controls in the top portion of the real-time data user interface 200 may include a replay button 202. The replay button 202, when selected, may cause the real-time data user interface 200 to begin transitioning into a historical data user interface. For example, the replay button 202, when selected, may cause the data view application 105 to update the real-time data user interface 200 to display a screen replay options window 300, as illustrated in FIG. 3. In particular, the real-time data user interface 200 can display the screen replay options window 300 in a new window or page, as a pop-up window that overlays at least a portion of the content depicted in the real-time data user interface 200 (e.g., the content depicted in FIG. 2), in a window or pane in the real-time data user interface 200 that is adjacent to the main portion of the real-time data user interface 200 (e.g., the size of the main portion of the real-time data user interface 200 may be adjusted so that the screen replay options window 300 can be displayed), and/or the like.

The screen replay options window 300 may allow an operator to define the time range of historical data to retrieve, the amount of historical data to retrieve, and/or a speed at which the historical data will be replayed in the historical data user interface. As illustrated in FIG. 3, the screen replay options window 300 includes a dropdown menu 302 that allows an operator to select a time span of historical data to retrieve. For example, the operator can use the dropdown menu 302 to choose the time span (e.g., 48 hours) that defines a time period between a time instant corresponding to the earliest historical data that is retrieved and a time instant corresponding to the latest historical data that is retrieved.

The screen replay options window 300 can also include a dropdown menu 304 that allows an operator to select a start date (e.g., Feb. 19, 2021) that defines the date on which a time instant corresponding to the earliest historical data to retrieve falls. In addition, the screen replay options window 300 can include a time spinner 306 that allows an operator to select a start time (e.g., 11:12:54 AM) that defines the time of the earliest historical data to retrieve.

Furthermore, the screen replay options window 300 can include a dropdown menu 308 that allows an operator to select a numerical value for a historical data replay interval. For example, the historical data replay interval (e.g., 15 minutes, 20 minutes, 30 minutes, 32 minutes, etc.) may define the time instants during the time span selected via the dropdown menu 302 that correspond to historical data to retrieve. In particular, the data view application 105 may retrieve historical data associated with a time instant that is a multiple of X minutes (e.g., 0 minutes, X minutes, 2X minutes, 3X minutes, 4X minutes, etc.) after the start time selected via the time spinner 306 and that is not more than the time span selected via the dropdown menu 302 after the start date and time selected via the dropdown menu 304 and the time spinner 306. The historical data replay interval may also define the time period between each incremental step during the historical data replay process. As described herein, the historical data user interface may include a slider that can step forward or backward automatically or manually. The number of positions to which the slider can step or move may be defined by one plus the number of historical data replay intervals selected via the dropdown menu 308 that fall within the time span selected via the dropdown menu 302 (e.g., because historical data may be retrieved for a time at the beginning of the first historical data replay interval and a time at the end of the last historical data replay interval). The historical data depicted in the historical data user interface when the slider is at a first position may correspond to time instants that are X minutes before time instants that correspond to historical data depicted in the historical data user interface when the slider moves forward from the first position to the next available position, where X is the numerical value of the historical data replay interval selected via the dropdown menu 308.

As an illustrative example, FIG. 3 depicts the time span as being 48 hours, the start date as being Feb. 19, 2021, the start time as being 11:12:54 AM, and the historical data replay interval as being 15 minutes. In response to an operator finalizing this selection (e.g., via selection of start button 312), the data view application 105 (e.g., the data replay manager 106) may retrieve from the measurements data store(s) 130, the state data store 150, the physical component(s) 140, and/or the historical data store 126 historical data associated with time instants on or about 11:12:54 AM on Feb. 19, 2021 (e.g., 0 minutes after the start time), 11:27:54 AM on Feb. 19, 2021 (e.g., 15 minutes after the start time), 11:42:54 AM on Feb. 19, 2021 (e.g., 30 minutes after the start time), 11:57:54 AM on Feb. 19, 2021 (e.g., 45 minutes after the start time), and so on up to 11:12:54 AM on Feb. 21, 2021 (e.g., 2880 minutes or 48 hours after the start time). Thus, the data view application 105 may retrieve 193 sets of historical data values, which is one greater than the number of 15 minute historical data replay intervals that fall within the 48 hour time span (e.g., because historical data may be retrieved for a time at the beginning of the first historical data replay interval (11:12:54 AM on Feb. 19, 2021) and a time at the end of the last historical data replay interval (11:12:54 AM on Feb. 21, 2021)). The slider in the historical data user interface may therefore be able to move to 193 different positions, where each position corresponds to a time that is 15N minutes after the start time (with N being between 0 and 192). For example, the first position of the slider (e.g., the left-most position of the slider in the historical data user interface) may correspond to 11:12:54 AM on Feb. 19, 2021, and the last position of the slider (e.g., the right-most position of the slider in the historical data user interface) may correspond to 11:12:54 AM on Feb. 21, 2021.

The speed at which the slider moves, and therefore the speed at which the historical data is replayed, in the historical data user interface may depend on the numerical value selected via dropdown box 310. For example, the numerical value selected via the dropdown box 310 may define the number of times a second that the slider moves or steps forward one position when the historical data is being played in the historical data user interface. Here, the operator has selected the value 4 via the dropdown menu 310. Thus, when the historical data is played in the historical data user interface, the slider may move forward 4 positions every second or move forward 1 position every 0.25 seconds. As a result, within a 1 second time span, the operator may see historical data values corresponding to a 1 hour period (e.g., each forward movement of the slider corresponds to a 15 minute historical data replay interval, and 4 forward movements of the slider therefore cover 1 hour of time).

As described herein, the data view application 105 may begin retrieving the historical data defined by the values selected via the dropdown menu 302, the dropdown menu 304, the time spinner 306, and/or the dropdown menu 308 in response to an operator selecting the start button 312. Once the start button 312 is selected, progress bar 314 may indicate the progress of the retrieval of the historical data. For example, the progress bar 314 may include a shaded portion, where a percentage of the progress bar 314 covered by the shaded portion may indicate the percentage of historical data that has been retrieved and/or the percentage of the total time to perform the historical data retrieval that has passed. In some embodiments, not shown, the progress bar 314 or another portion of the screen replay options window 300 may indicate a time that has passed so far during the historical data retrieval process, a time remaining until the historical data has been retrieved, a numerical indication of the percentage of historical data that has been retrieved, and/or a numerical indication of the percentage of historical data that has yet to be retrieved.

The data view application 105 can retrieve historical data that correspond with the selections made via the screen replay options window 300 and that are measured or captured by some or all of the sensors associated with the physical component(s) 140 graphically represented in the real-time data user interface 200 from which the replay button 202 is selected. Here, the data view application 105 may retrieve historical data measured or captured by some or all of the sensors associated with the tank 211, the pumps 215A-C, the tank 217, the pumps 223A-D, the tank 224, the tank 226, and the pumps 230A-B. If, for example, the real-time data user interface 200 depicted only the area 210 (e.g., in response to the operator selecting the area 210 in the real-time data user interface 200) and then the operator selected the replay button 202, then the data view application 105 may only retrieve historical data measured or captured by some or all of the sensors associated with the physical component(s) 140 in the area 210 (e.g., the tank 211, the pumps 215A-C, and the tank 217).

Figure 4A:
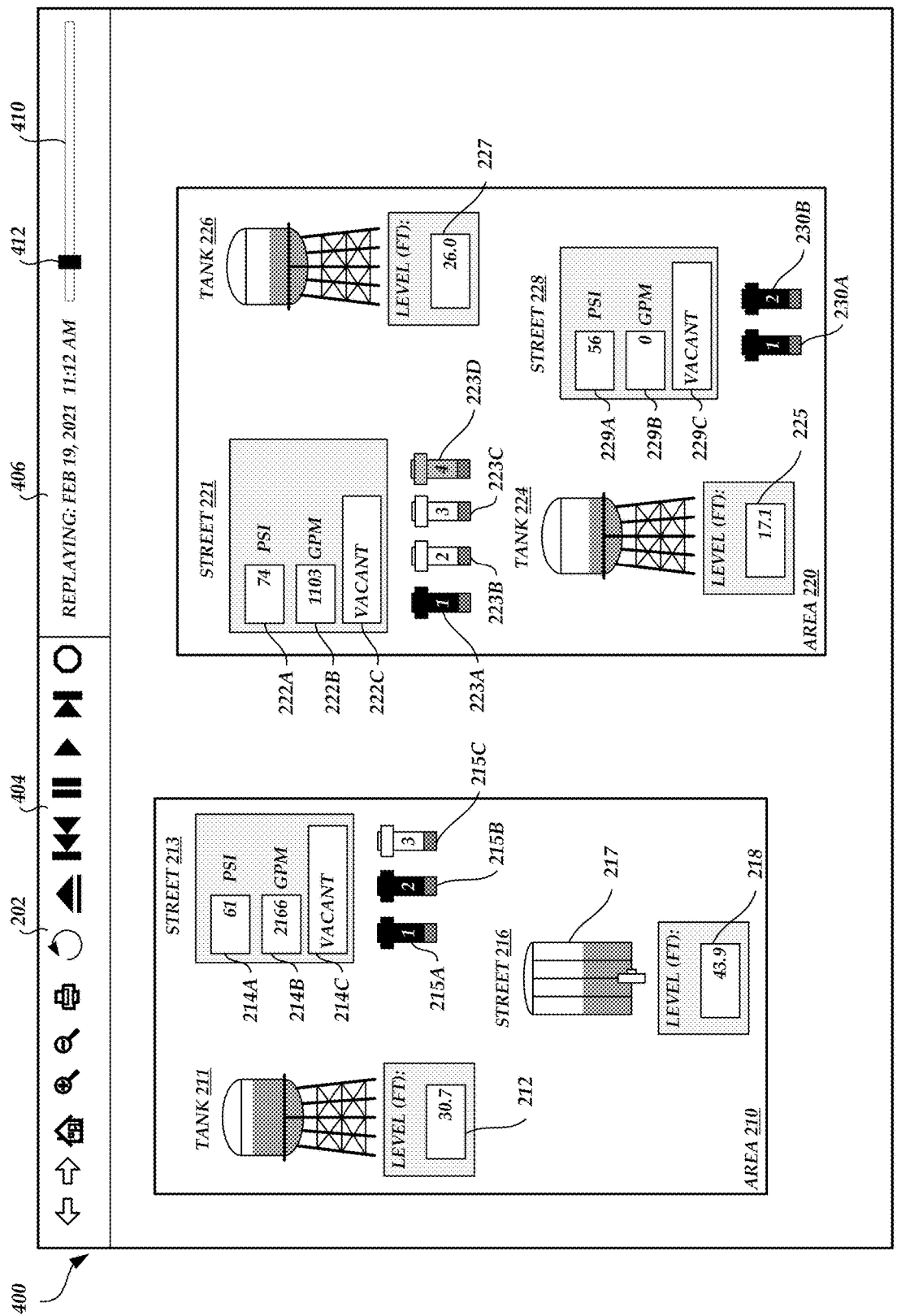
FIGS. 4A-4C illustrate an example historical data user interface in which historical data is depicted.

Once the data view application 105 has retrieved all of the historical data or some percentage of the historical data (e.g., 70%, 80%, 90%, etc.), the user interface generator 108 may update the user device 102 display by rendering and displaying a historical data user interface 400 in place of the real-time data user interface 200, as illustrated in FIG. 4A.

As illustrated in FIG. 4A, the historical data user interface 400 appears to be nearly identical to the real-time data user interface 200. For example, the main portion of the historical data user interface 400 depicts the graphical representation of the tank 211, the text field 212, the text fields 214A-C, the graphical representations of the pumps 215A-C, the graphical representation of the tank 217, the text field 218, the text fields 222A-C, the graphical representations of the pumps 223A-D, the graphical representation of the tank 224, the text field 225, the graphical representation of the tank 226, the text field 227, the text fields 229A-C, and the graphical representations of the pumps 230A-B in the same layout as these visualizations appear in the main portion of the real-time data user interface 200. In particular, the static portions of these graphical representations (e.g., the outlines and positions of the tanks 211, 217, 224, and 226; the outlines and positions of the pumps 215A-C, 223A-D, and 230A-B; and the outlines and positions of the text fields 212, 214-C, 218, 222A-C, 225, 227, and 229A-C) remains constant and unchanged. However, the top portion of the historical data user interface 400 includes selectable elements that do not appear in the real-time data user interface 200 and the main portion of the historical data user interface 400 depicts historical data rather than real-time data (e.g., the dynamically updatable elements are different).

For example, the top portion of the historical data user interface 400 includes playback controls 404, time field 406, a slider bar 410, and a slider 412. The playback controls 404 can include an eject button (e.g., a button that, when selected, causes the real-time data user interface 200 to once again be displayed in place of the historical data user interface 400), a rewind button that can reset the playback and/or be used step back the slider 412 one or more positions, a pause button, a play button, a fast forward or step forward button that can be used to step forward the slider 412 one or more positions, a stop button, and/or a record button (not shown). An operator can use the playback controls 404 to control a position of the slider 412 along the slider bar 410. Alternatively or in addition, the operator can control the position of the slider 412 along the slider bar 410 by selecting and/or dragging the slider 412 to a desired position.

As described herein, the position of the slider 412 along the slider bar 410 may correspond to a particular historical time, which is displayed in the time field 406. The historical data that appears in the main portion of the historical data user interface 400 may correspond with a time instant that matches or otherwise maps to the time displayed in the time field 406.

Once the historical data user interface 400 is rendered and displayed, the slider 412 may start at an initial position along the slider bar 410 (e.g., the left-most position along the slider bar 410) and automatically begin stepping forward along the slider bar 410 (e.g., moving right along the slider bar 410) one position at a time at a speed determined by the selection made via the dropdown menu 310. The operator can allow the slider 412 to continue moving along the slider bar 410 until the slider 412 reaches the end of the slider bar 410, at which point the animation or playback of the historical data may stop or repeat from the beginning (e.g., the slider 410 may move to the left-most position along the slider bar 412 and begin stepping forward once again). Alternatively or in addition, the operator can stop the automatic animation or playback of the historical data at any time (e.g., when the slider 412 is at any position along the slider bar 412) and/or move the slider 412 to a desired position.

Before, during, and/or after the slider 412 reaches a new position along the slider bar 410, the data view application 105 (e.g., the user interface generator 108) may update or re-render the historical data user interface 400 to display a time corresponding to the new position of the slider 412 in the time field 406.

Before, during, and/or after the slider 412 reaches a new position along the slider bar 410, the data view application 105 (e.g., the data replay manager 106) may also identify the historical data values that have been retrieved that have a time instant (e.g., historical data values that were captured or measured by sensor(s) at a time instant or that were received in real-time by a data view application 105 at a time instant) that matches or otherwise maps to the time corresponding to the new position of the slider 412. Once identified, the data view application 105 (e.g., the user interface generator 108) can update or re-render the historical data user interface 400 to display the identified historical data values in the appropriate locations within the historical data user interface 400. As described herein, real-time data and/or historical data may be tagged or otherwise associated with an identifier. Similarly, dynamically updatable elements in the historical data user interface 400 may be associated with an identifier. In some embodiments, the historical data originating from a particular physical component 140 is tagged with the same identifier as the identifier associated with a dynamically updatable element corresponding to the same physical component 140. In other embodiments, the historical data originating from a particular physical component 140 is tagged with a different identifier than the identifier associated with a dynamically updatable element corresponding to the same physical component 140. If the identifiers are the same, the data view application 105 can identify the identifier associated with a particular historical data value, identify the location in the historical data user interface 400 of the dynamically updatable element associated with the identified identifier, and cause the historical data user interface 400 to display the historical data value at the identified location in the historical data user interface 400. If the identifiers are different, the data view application 105 may store mappings between the historical data identifiers and the dynamically updatable element identifiers, and the data view application 105 can identify the identifier associated with a particular historical data value, identify the dynamically updatable element identifier that maps to the historical data identifier, identify the location in the historical data user interface 400 of the dynamically updatable element associated with the identified dynamically updatable element identifier, and cause the historical data user interface 400 to display the historical data value at the identified location in the historical data user interface 400.

Thus, each time the slider 412 moves forward or backward along the slider bar 410, the main portion of the historical data user interface 400 may be updated to depict historical data associated with the time corresponding to the position of the slider 412. In this way, the historical data user interface 400 may depict an automatically or manually-controlled animation or replay of historical data in a layout or arrangement that is similar to the layout or arrangement of data that was shown or that could have been shown to an operator in real-time as the data was measured or captured. The historical data user interface 400 may therefore provide an interface in which, in a single view, an operator can view historical data corresponding to multiple physical components 140 over a set period of time. The historical data user interface 400 is an improved user interface because the historical data user interface 400 allows an operator to view historical data corresponding to multiple physical components 140, view historical data values that correspond to different parameters (e.g., pressure, flow rate, liquid storage height, pump state, etc.), and view the geographical or spatial relationships between physical components 140 and/or their corresponding historical data within a single interface and without having to perform additional navigational steps (e.g., to open new windows, pages, tabs, etc.; to scroll horizontally and/or vertically; etc.) once the screen replay options are provided.

For example, FIG. 4A illustrates that, at 11:12 AM on Feb. 19, 2021, the measured height of the liquid stored in the tank 211 was 30.7 feet (as indicated by the shaded portion of the graphical representation of the tank 211 and the text field 212), the pressure at the street 213 was 61 PSI (as indicated by the text field 214A), the flow rate at the street 213 was 2166 gallons per minute (as indicated by the text field 214B), the vacancy at the street 213 was vacant (as indicated by the text field 214C), the state of the pump 215A was off (as indicated by the appearance of the graphical representation of the pump 215A), the state of the pump 215B was off (as indicated by the appearance of the graphical representation of the pump 215B), the state of the pump 215C was on (as indicated by the appearance of the graphical representation of the pump 215C), the measured height of the liquid stored in the tank 217 was 43.9 feet (as indicated by the shaded portion of the graphical representation of the tank 217 and the text field 218), the pressure at the street 221 was 74 PSI (as indicated by the text field 222A), the flow rate at the street 221 was 1103 gallons per minute (as indicated by the text field 222B), the vacancy at the street 221 was vacant (as indicated by the text field 222C), the state of the pump 223A was off (as indicated by the appearance of the graphical representation of the pump 223A), the state of the pump 223B was on (as indicated by the appearance of the graphical representation of the pump 223B), the state of the pump 223C was on (as indicated by the appearance of the graphical representation of the pump 223C), the state of the pump 223D was transitioning (as indicated by the appearance of the graphical representation of the pump 223D), the measured height of the liquid stored in the tank 224 was 17.1 feet (as indicated by the shaded portion of the graphical representation of the tank 224 and the text field 225), the measured height of the liquid stored in the tank 226 was 26.0 feet (as indicated by the shaded portion of the graphical representation of the tank 226 and the text field 227), the pressure at the street 228 was 56 PSI (as indicated by the text field 229A), the flow rate at the street 228 was 0 gallons per minute (as indicated by the text field 229B), the vacancy at the street 228 was vacant (as indicated by the text field 229C), the state of the pump 230A was off (as indicated by the appearance of the graphical representation of the pump 230A), and the state of the pump 230B was off (as indicated by the appearance of the graphical representation of the pump 230B).

Figure 4B:
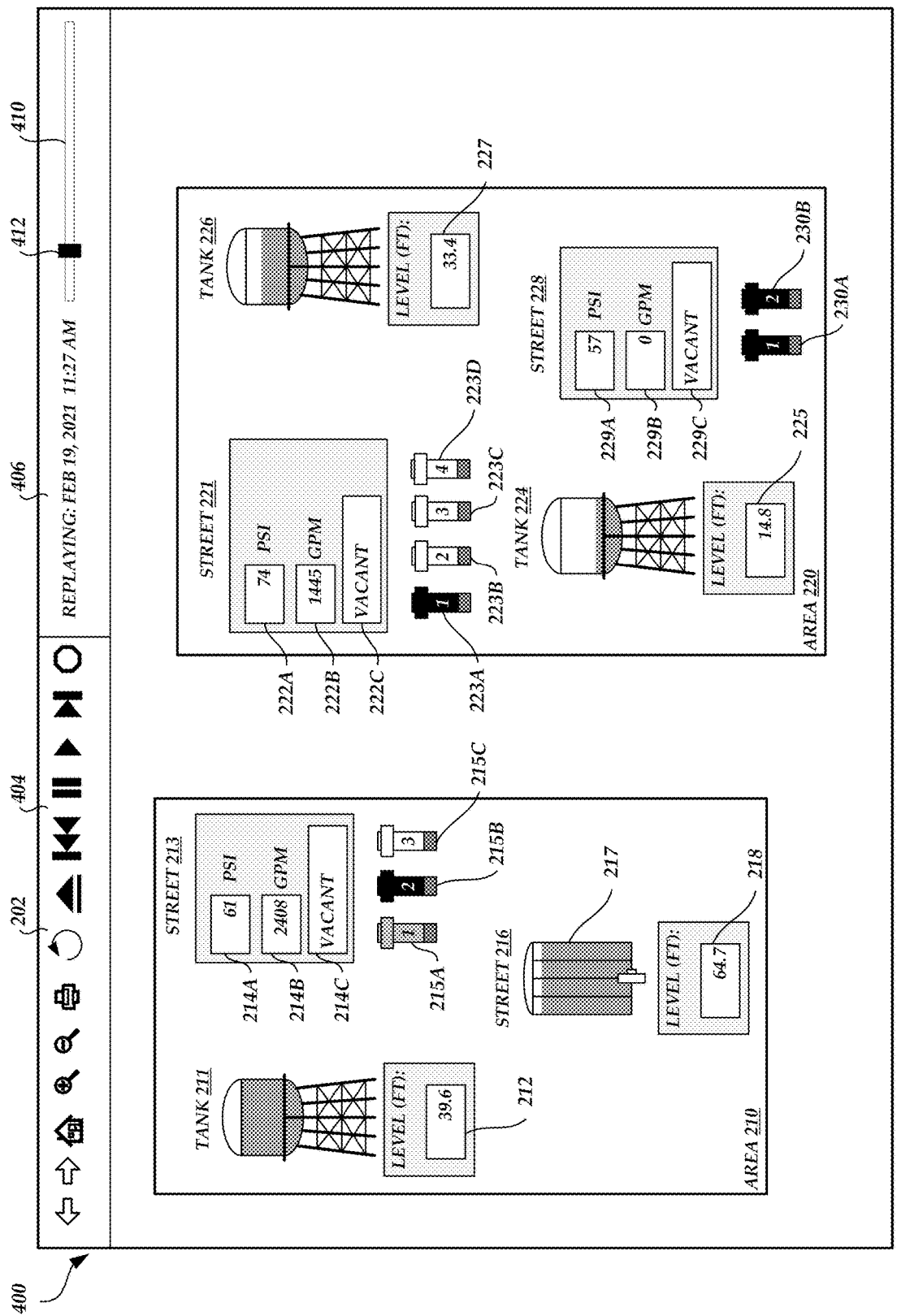
Figure 4C:
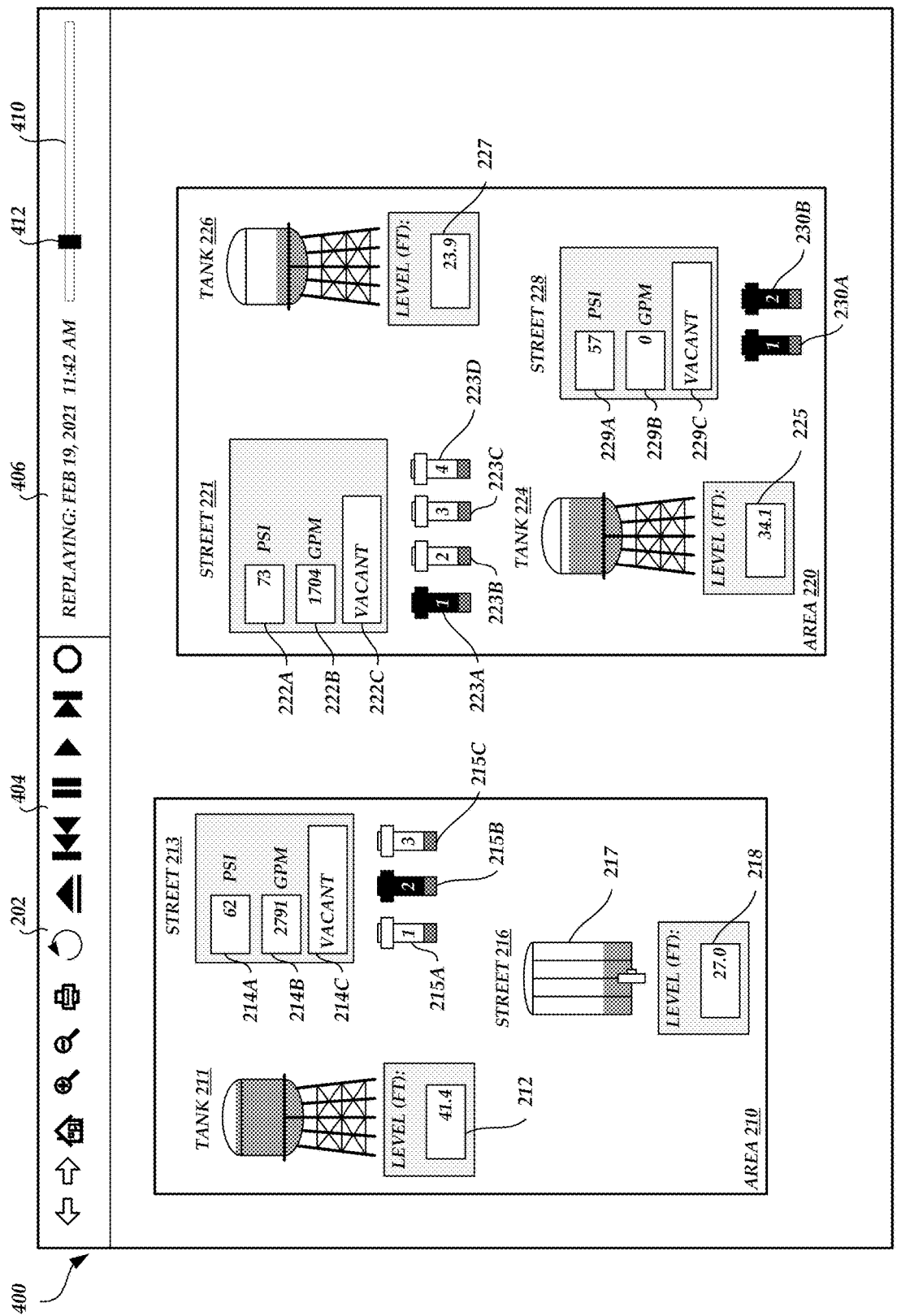

FIGS. 4B and 4C illustrate the progression of the slider 412 along the slider bar 410 as the slider 412 steps forward two positions. As illustrated in FIG. 4B, the slider 412 steps forward one position from the position depicted in FIG. 4A, such that the time corresponding to the new slider 412 position (e.g., 11:27 AM) is 15 minutes after the time corresponding to the old slider 412 position (e.g., 11:12 AM, where the time interval between the two successive positions is 15 minutes because the operator selected a historical data replay interval of 15 minutes via the dropdown menu 308). In addition, the historical data displayed in the main portion of the historical data user interface 400 and the appearance of the dynamically updatable elements has been updated accordingly. For example, at 11:27 AM on Feb. 19, 2021, the measured height of the liquid stored in the tank 211 was 39.6 feet (as indicated by the shaded portion of the graphical representation of the tank 211 and the text field 212), the pressure at the street 213 was 61 PSI (as indicated by the text field 214A), the flow rate at the street 213 was 2408 gallons per minute (as indicated by the text field 214B), the vacancy at the street 213 was vacant (as indicated by the text field 214C), the state of the pump 215A was transitioning (as indicated by the appearance of the graphical representation of the pump 215A), the state of the pump 215B was off (as indicated by the appearance of the graphical representation of the pump 215B), the state of the pump 215C was on (as indicated by the appearance of the graphical representation of the pump 215C), the measured height of the liquid stored in the tank 217 was 64.7 feet (as indicated by the shaded portion of the graphical representation of the tank 217 and the text field 218), the pressure at the street 221 was 74 PSI (as indicated by the text field 222A), the flow rate at the street 221 was 1445 gallons per minute (as indicated by the text field 222B), the vacancy at the street 221 was vacant (as indicated by the text field 222C), the state of the pump 223A was off (as indicated by the appearance of the graphical representation of the pump 223A), the state of the pump 223B was on (as indicated by the appearance of the graphical representation of the pump 223B), the state of the pump 223C was on (as indicated by the appearance of the graphical representation of the pump 223C), the state of the pump 223D was on (as indicated by the appearance of the graphical representation of the pump 223D), the measured height of the liquid stored in the tank 224 was 14.8 feet (as indicated by the shaded portion of the graphical representation of the tank 224 and the text field 225), the measured height of the liquid stored in the tank 226 was 33.4 feet (as indicated by the shaded portion of the graphical representation of the tank 226 and the text field 227), the pressure at the street 228 was 57 PSI (as indicated by the text field 229A), the flow rate at the street 228 was 0 gallons per minute (as indicated by the text field 229B), the vacancy at the street 228 was vacant (as indicated by the text field 229C), the state of the pump 230A was off (as indicated by the appearance of the graphical representation of the pump 230A), and the state of the pump 230B was off (as indicated by the appearance of the graphical representation of the pump 230B).

As illustrated in FIG. 4C, the slider 412 steps forward one position from the position depicted in FIG. 4B, such that the time corresponding to the new slider 412 position (e.g., 11:42 AM) is 15 minutes after the time corresponding to the old slider 412 position (e.g., 11:27 AM, where the time interval between the two successive positions is 15 minutes because the operator selected a historical data replay interval of 15 minutes via the dropdown menu 308). In addition, the historical data displayed in the main portion of the historical data user interface 400 and the appearance of the dynamically updatable elements has been updated accordingly. For example, at 11:42 AM on Feb. 19, 2021, the measured height of the liquid stored in the tank 211 was 41.4 feet (as indicated by the shaded portion of the graphical representation of the tank 211 and the text field 212), the pressure at the street 213 was 62 PSI (as indicated by the text field 214A), the flow rate at the street 213 was 2791 gallons per minute (as indicated by the text field 214B), the vacancy at the street 213 was vacant (as indicated by the text field 214C), the state of the pump 215A was on (as indicated by the appearance of the graphical representation of the pump 215A), the state of the pump 215B was off (as indicated by the appearance of the graphical representation of the pump 215B), the state of the pump 215C was on (as indicated by the appearance of the graphical representation of the pump 215C), the measured height of the liquid stored in the tank 217 was 27.0 feet (as indicated by the shaded portion of the graphical representation of the tank 217 and the text field 218), the pressure at the street 221 was 73 PSI (as indicated by the text field 222A), the flow rate at the street 221 was 1704 gallons per minute (as indicated by the text field 222B), the vacancy at the street 221 was vacant (as indicated by the text field 222C), the state of the pump 223A was off (as indicated by the appearance of the graphical representation of the pump 223A), the state of the pump 223B was on (as indicated by the appearance of the graphical representation of the pump 223B), the state of the pump 223C was on (as indicated by the appearance of the graphical representation of the pump 223C), the state of the pump 223D was on (as indicated by the appearance of the graphical representation of the pump 223D), the measured height of the liquid stored in the tank 224 was 34.1 feet (as indicated by the shaded portion of the graphical representation of the tank 224 and the text field 225), the measured height of the liquid stored in the tank 226 was 23.9 feet (as indicated by the shaded portion of the graphical representation of the tank 226 and the text field 227), the pressure at the street 228 was 57 PSI (as indicated by the text field 229A), the flow rate at the street 228 was 0 gallons per minute (as indicated by the text field 229B), the vacancy at the street 228 was vacant (as indicated by the text field 229C), the state of the pump 230A was off (as indicated by the appearance of the graphical representation of the pump 230A), and the state of the pump 230B was off (as indicated by the appearance of the graphical representation of the pump 230B).

Because the operator may have selected a historical data replay speed of 4 times a second per the dropdown menu 310, the historical data user interfaces 400 depicted in FIGS. 4A-4C may be displayed by a user device 102 in succession over the span of 0.75 seconds. If, for example, the operator had selected a replay speed of 2 times a second per the dropdown menu 310, then the historical data user interfaces 400 depicted in FIGS. 4A-4C may be displayed by the user device 102 in succession over the span of 1.5 seconds.

To reduce the delay in rendering and displaying the different historical data user interfaces 400 depicted in FIGS. 4A-4C, the data view application 105 may store retrieved historical data in volatile memory (e.g., random access memory (RAM)), non-volatile RAM, or solid state memory devices. Thus, the time taken to read and/or write data from traditional storage devices (e.g., hard disks, optical disks, etc.) can be avoided, thereby reducing the time it takes the user interface generator 108 to obtain, render, and display the historical data within the historical data user interface 400.

As described herein, the historical data user interfaces 400 depicted in FIGS. 4A-4C may provide an operator with the same view that is displayed when the operator is viewing real-time data via the real-time data user interface 200. However, an operator may not be constantly viewing the real-time data user interface 200. For example, the operator may look away from the screen displaying the real-time data user interface 200, minimize the data view application 105 window, close the data view application 105 window, open another application window that hides the data view application 105 window, and/or the like. Thus, the historical data user interfaces 400 may not only provide an operator with the ability to re-view information that was initially displayed as the data was being measured or captured in real-time, but the historical data user interfaces 400 may also provide an operator with the ability to see how the real-time data would have been depicted in the real-time data user interface 200 if the real-time data user interface 200 had been visible on a screen of the user device 102 or another user device 102 when the data was being measured or captured in real-time.

To enhance the effectiveness of the historical data user interface 400 in addressing diagnostic or educational issues, the data view application 105 can retrieve keystroke data in addition to retrieving historical data. For example, the data view application 105 can retrieve keystroke data locally from the user device 102 running the data view application 105 or externally from the keystroke data store 160. In particular, the data view application 105 may track user interface interactions with the real-time data user interface 200 (e.g., may track interactions that occur when real-time data is being displayed). Such user interface interactions may include operator keystrokes, operator mouse clicks, operator menu selections, physical component 140 control instructions initiated by an operator, pop-up windows that appeared in the real-time data user interface 200 (either in response to an operator action or automatically, such as in response to received real-time data having certain values), and/or the like. Each user interface interaction may be associated with a time at which the interaction occurred, and the data view application 105 may store the user interface interactions as keystroke data locally and/or in the keystroke data store 160. When the operator provides screen replay options via the screen replay options window 300, the data view application 105 can retrieve the historical data in a manner as described herein and the keystroke data that corresponds with the screen replay options (e.g., that is associated with a time falling within the selected time span and historical data replay intervals, that appeared or occurred while a view of the physical components 140 for which historical data is being retrieved was being displayed, etc.).

Once the historical data and the keystroke data is retrieved, the data view application 105 can cause the historical data and the keystroke data to be displayed concurrently or in different windows, tabs, pages, etc. within the historical data user interface 400. For example, the main portion of the historical data user interface 400 or another portion of the historical data user interface 400 may display a virtual or electronic keyboard (e.g., a graphical representation of a keyboard) concurrently with the dynamically updatable elements. If, at a time corresponding to the position of the slider 410, an operator had selected a key on the keyboard, the data view application 105 may cause the virtual or electronic keyboard to highlight, mark, or otherwise indicate the key selected by the operator. Similarly, if, at a time corresponding to the position of the slider 410, an operator had selected a zoom-in button via a mouse click, the data view application 105 may cause a mouse icon to appear in the historical data user interface 400 at the location of the zoom-in button, with the mouse icon or zoom-in button pressed down, highlighted, annotated, or otherwise marked to indicate that the zoom-in button was selected. As another example, if, at a time corresponding to the position of the slider 410, a pop-up window appeared in the real-time data user interface 200 (e.g., indicating that a particular physical component 140 has failed), then the data view application 105 may cause the same pop-up window to appear in the historical data user interface 400 at the same location as the pop-up window appeared in the real-time data user interface 200 and with the same message that was displayed when the pop-up window appeared in the real-time data user interface 200. Accordingly, an operator can step forward and backward using the slider 410 to concurrently view historical data and user interface interactions that took place when the historical data was being displayed in real-time.

Displaying both the historical data and the user interface interactions may allow the operator, a supervisor, a trainee, or another individual or entity to more accurately diagnose physical component 140 failures or malfunctions, especially when such failures or malfunctions were caused by an operator action (in which case the historical data, by itself, may be inadequate to identify the cause of the failure or malfunction). In addition, displaying both the historical data and the user interface interactions may allow the operator, a supervisor, a trainee, or another individual or entity learn how to control the physical component(s) 140 safely, which can reduce the likelihood that future errors, failures, malfunctions, or damage occur.

In an alternative embodiment, the data view application 105 can take screenshots or snapshots of the real-time data user interface 200 periodically (e.g., every second, every minute, every 15 minutes, every hour, etc.). The data view application 105 can store the screenshots or snapshots locally on the user device 102 that is running the data view application 105 or in a data store external to the user device 102. For example, the data view application 105 can save each screenshot or snapshot as an image that depicts some or all of the static and/or dynamically updatable elements present in the real-time data user interface 200 as of the time at which the screenshot or snapshot was captured. The data view application 105 can then store this image in association with a time at which the screenshot or snapshot was captured (or at which the real-time data depicted in the real-time data user interface 200 was captured or measured) locally or in an external data store. The data view application 105 can capture the screenshots or snapshots as long as the data view application 105 is running, whether or not the real-time data user interface 200 is actually being viewed, is minimized, is maximized, is partially or completely hidden by another window, etc. When an operator selects the replay button 202, the data view application 105 can retrieve the images rather than the historical data, and can cause the historical data user interface 400 to display an image in the main portion of the historical data user interface 400 that is associated with a time that matches or otherwise maps to the time indicated in the time field 406 (e.g., that matches or otherwise maps to the time corresponding to the position of the slider 412). Thus, movement of the slider 412 backward or forward along the slider bar 410 may cause the user interface generator 408 to update the historical data user interface 400 to depict a different image.

In further embodiments, the data view application 105 can treat the images as frames of a video or animation. Thus, before, during, and/or after the operator selects the replay button 202, the data view application 105 can process the images using compression techniques to create frame data that indicates differences between successive images (e.g., between successive frames). In other words, the frame data can include an initially captured image, data indicating portion(s) (e.g., pixel(s), value(s), etc.) of the initially captured image that changed to form a second captured image, data indicating portion(s) of the second captured image that changed to form a third captured image, data indicating portion(s) of the third captured image that changed to form a fourth captured image, and so on. Instead of storing each of the images locally or in an external data store, the data view application 105 can instead store the frame data locally or in an external data store. The frame data may have a smaller file size than the file size of the set of images upon which the frame data is based given that the frame data generally stores differences between images rather than the images themselves, which may reduce data view application 105 storage and/or retrieval times. The user interface generator 108 can then generate and update the historical data user interface 400 using the frame data instead of the images themselves (e.g., when the slider 412 moves to a position along the slider bar 410, the user interface generator 108 can generate an image using frame data corresponding to the initially captured image and/or to images that were captured between the initially captured image and an image associated with a time corresponding to the current slider 412 position). By using the frame data instead of the images themselves, the time it may take the user interface generator 108 to render, update, and/or display the historical data user interface 400 may be reduced given the smaller file size of the frame data as compared to the images.

The data view application 105 can also use caching to improve historical data user interface 400 render and display times. For example, the data view application 105 can store, in a cache local to the user device 102 running the data view application 105, a set of historical data that was retrieved in response to an operator selecting the replay button 202 and providing screen replay options via the screen replay option window 300. The data view application 105 can repeat this storage operation each time a set of historical data is retrieved. The cache may store the N most recent sets of historical data that were retrieved, where N can be any integer value (e.g., 1, 2, 3, 5, 10, 15, 20, etc.). Before retrieving historical data corresponding to the provided screen replay options, the data view application 105 can query the cache to determine whether any sets of historical data stored therein satisfy or at least partially satisfy (e.g., some of the historical data falls within the selected time span, but other historical data does not fall within the selected time span) the provided screen replay options. If a set of historical data or a portion of a set of historical data satisfies or at least partially satisfies the provided screen replay options, the data view application 105 can retrieve this historical data from the cache rather than from an external source (and can retrieve any remaining historical data from the external source), which may reduce historical data retrieval times given the retrieval latency that may be experienced for submitting requests over the network 110. The data view application 105 can use similar caching techniques to cache images, frame data, keystroke data, and/or the like.

While FIGS. 4A-4C depict a single historical data user interface 400 being displayed, this is not meant to be limiting. For example, an operator can select the replay button 202 multiple times to view historical data corresponding to different time ranges concurrently, in succession, or any combination thereof. If the operator submits a request to view historical data corresponding to a first set of physical components 140 and a first time range, to view historical data corresponding to the first set of physical components 140 and a second time range, to view historical data corresponding to the first set of physical components 140 and a third time range, and so on, then the data view application 105 may cause the user device 102 running the data view application 105 to display one window depicting a historical data user interface corresponding to historical data during the first time range, a second window depicting a historical data user interface corresponding to historical data during the second time range, a third window depicting a historical data user interface corresponding to historical data during the third time range, and so on. The different historical data user interfaces can also be displayed within different tabs, panes, containers, pages, etc. The data view application 105 may cause the user device 102 to display some or all of the windows concurrently, may cause the user device 102 to display the windows in an overlapping manner (where a first window may appear on top, a second window may appear partially or fully underneath the first window, a third window may appear partially or fully underneath the first and second windows, and so on), may cause the user device 102 to display some or all of the windows in different tabs of the data view application 105, may cause the user device 102 to display one or none of the windows (e.g., generate the windows and set them initially in a minimize state), may cause the user device 102 to display a prompt that asks the operator which window(s) to display concurrently and which to minimize, may cause the user device 102 to display a prompt that asks the operator to select an order in which the windows are displayed (where the first ordered window may appear on top, the second ordered window may appear partially or fully underneath the first ordered window, the third ordered window may appear partially or fully underneath the first and second ordered windows, and so on), and/or the like.

Not only can the data view application 105 display multiple historical data user interfaces 400 concurrently, but the data view application 105 can also display one or more real-time data user interfaces 200 concurrently with one or more historical data user interfaces 400. The data view application 105 can update each real-time data user interface 200 independently in a manner as described herein. Similarly, the data view application 105 can allow each historical data user interface 400 to be independently controlled (and this may be true even if no real-time data user interface 200 is displayed concurrently with a historical data user interface 400). Thus, for the same set of physical components 140, an operator can concurrently view real-time data in the real-time data user interface 200 that updates periodically or continuously, replay historical data captured or measured during a first time span, replay historical data captured or measured during a second time span, and so on.

As described above, the playback controls 404 may include a record button. The record button, when selected, may cause the data view application 105 to generate one or more frames, where the data view application 105 may generate a frame each time the slider 412 is moved and until the recording is stopped (e.g., via another selection of the record button, via a selection of the stop button, etc.). Each frame may be a snapshot or screenshot of the main portion of the historical data user interface 400. Once the frames are generated or while the frames are being generated, the data view application 105 can combine some or all of the frames to form an animation or video. The data view application 105 can store the frames and/or the animation or video locally on the user device 102 running the data view application 105 and/or in an external data store. The data view application 105 can then share the stored frames and/or animation or video with another user device 102 via the network 110 upon request. As a result, if the same operator wants to view the historical data corresponding to a particular time span at two different times, the data view application 105 can retrieve and play the frames and/or animation or video instead of retrieving the historical data for a second time or retrieving the historical data from cache. Similarly, if one operator wants to view the historical data previously viewed by another operator, the user device 102 operated by the operator that has already viewed the historical data can transmit the frames and/or animation or video the user device 102 operated by the operator that wants to view the historical data, and therefore the user device 102 operated by the operator that wants to view the historical data would not have to retrieve the historical data and recreate the historical data user interface 400.

While the operator may select the historical data playback speed via the dropdown menu 310, the historical data user interface 400 may allow an operator to adjust the playback speed (not shown). For example, the historical data user interface 400 may include a dropdown menu similar to the dropdown menu 310, which would allow the user to adjust the number of positions that the slider 410 moves per second when the historical data is being replayed.

In further embodiments, the data view application 105 may use artificial intelligence to predict historical data that an operator may look to retrieve and can retrieve the historical data prior to the operator submitting the request via the replay button 202 selection and/or via the screen replay options window 300. For example, the data view application 105 can track the screen replay options selected by an operator over time, including the time at which the screen replay options were selected, the physical component(s) 140 for which historical data is requested, and/or the like. The data view application 105 can compile this data as training data, and can train an artificial intelligence model (e.g., a machine learning model, a neural network, etc.) that predicts the screen replay options that an operator may select in the future and/or a time at which the operator may provide such screen replay options. Periodically, the data view application 105 can provide to the trained artificial intelligence model input data, such as a current time, a list of physical component(s) depicted in a real-time data user interface 200 being viewed by an operator, and/or the like. In response, the trained artificial intelligence model may output an indication of the screen replay options that the operator may select in the future and/or a time at which the operator may provide the screen replay options, if at all. If the trained artificial intelligence model outputs an indication of the screen replay options that the operator may select and/or a time at which the operator may provide the screen replay options, the data view application 105 may retrieve historical data corresponding to the predicted screen replay options at some time before the predicted time at which the operator may provide the screen replay options. Optionally, the data view application 105 can also render, but not yet display, a historical data user interface 400 depicting the retrieved historical data. Thus, the data view application 105 may use artificial intelligence to pre-retrieve historical data and/or pre-render the historical data user interface, thereby reducing the time it takes for the data view application 105 to render and/or display the historical data user interface 400 when requested.

Screen Replay Routine

Figure 5:
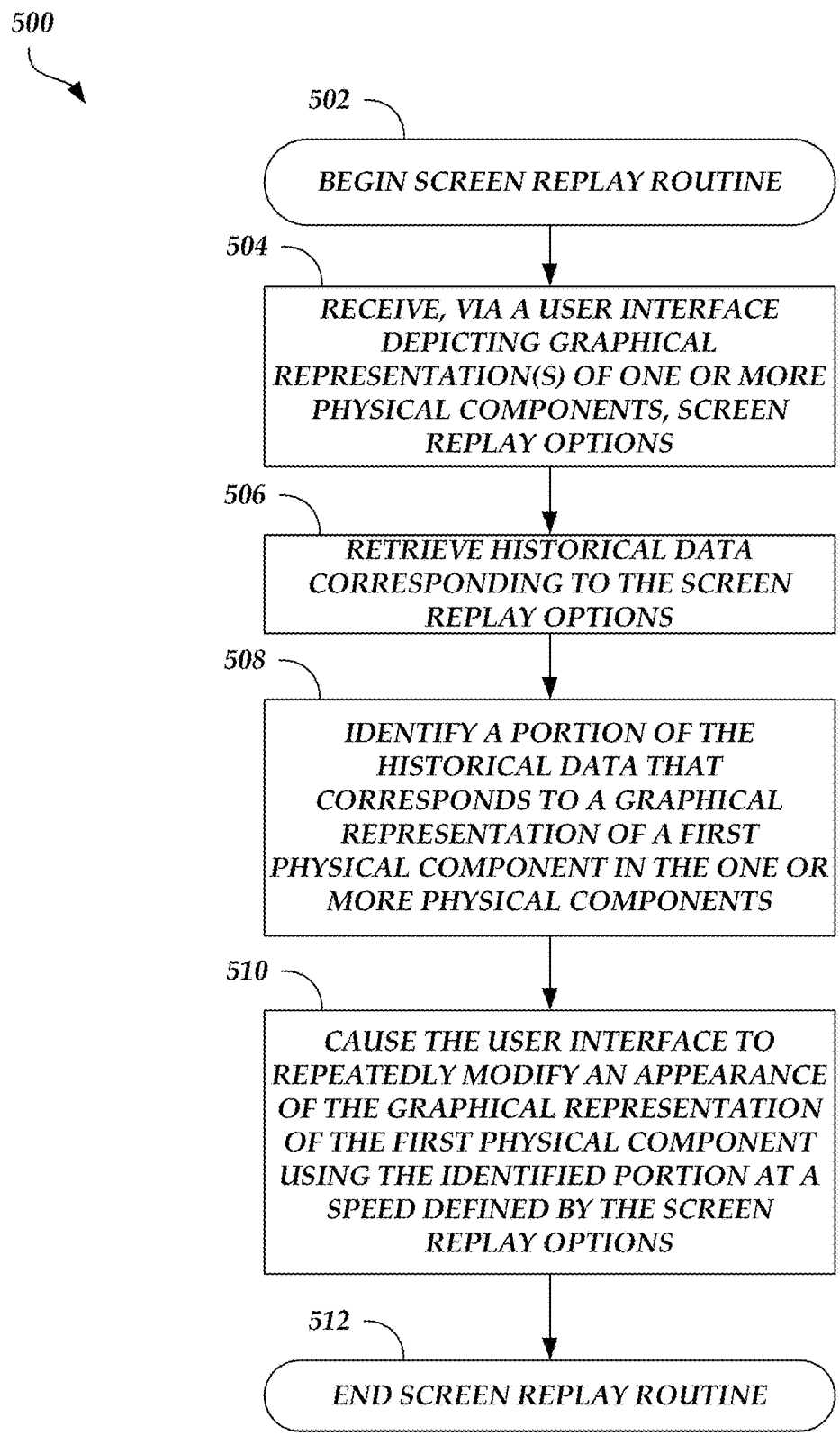
FIG. 5 is a flow diagram depicting a screen replay routine, according to one embodiment.

FIG. 5 is a flow diagram depicting a screen replay routine 500, according to one embodiment. As an example, the data view application 105 running on a user device 102 can be configured to execute the screen replay routine 500. The screen replay routine 500 begins at block 502.

At block 504, screen replay options are received via a user interface depicting graphical representation(s) of one or more physical components. For example, the user interface may be a real-time data user interface that is depicting data as the data is being captured or measured by sensor(s) associated with the physical component(s). The screen replay options can include a time span, a start time and date, a historical data replay interval, and a playback speed.

At block 506, historical data corresponding to the screen replay options are retrieved. For example, historical data associated with a time that falls on or after the start time and date, within a time span after the start time and date, and in accordance with a historical data replay interval may be retrieved.

At block 508, a portion of the historical data that corresponds to a graphical representation of a first physical component in the one or more physical components is identified. For example, the historical data may be associated with identifiers and the graphical representation of the first physical component may be associated with an identifier. A portion of the historical data may have an identifier that matches the first physical component identifier or that maps to the first physical component identifier.

At block 510, the user interface is caused to repeatedly or periodically modify an appearance of the graphical representation of the first physical component using the identified portion of the historical data at a speed defined by the screen replay options. For example, the user interface may now be a historical data user interface, and the appearance of the graphical representation of the first physical component may be modified each time the slider 410 moves along the slider bar 412 and the value of a parameter associated with the first physical component at a time corresponding to the position of the slider 410 has changed from a previously depicted value. As an illustrative example, if the first physical component is a tank, the amount of the graphical representation of the tank that is shaded may be modified each time the slider 410 moves along the slider bar 412 and the measured height of a liquid stored in the tank at a time corresponding to the position of the slider 410 has changed from a previously depicted height. After causing the user interface to repeatedly modify an appearance of the graphical representation of the first physical component, the screen replay routine 500 ends, as shown at block 512.

Terminology

All of the methods and tasks described herein may be performed and fully automated by a computer system. The computer system may, in some cases, include multiple distinct computers or computing devices (for example, physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (for example, solid state storage devices, disk drives, etc.). The various functions disclosed herein may be embodied in such program instructions, or may be implemented in application-specific circuitry (for example, ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (for example, not all described operations or events are necessary for the practice of the algorithm). Moreover, in certain embodiments, operations or events can be performed concurrently, for example, through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (for example, ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," "for example," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A device comprising:
   memory storing computer-executable instructions; and
   a processor in communication with the memory, wherein the computer-executable instructions, when executed by the processor, cause the processor to at least:
      process a selection of one or more screen replay options received via a user interface, wherein the one or more screen replay options corresponding to a time span before a current time, wherein the user interface depicts, for each physical component in a plurality of physical components, a graphical representation of the respective physical component and a current measurement associated with the respective physical component;
      retrieve historical data and keystroke data corresponding to the one or more screen replay options;
      identify a portion of the retrieved historical data that corresponds to the graphical representation of a first physical component in the plurality of physical components; and
   update the user interface to modify repeatedly an appearance of the graphical representation of the first physical component to depict the identified portion of the retrieved historical data that corresponds to the graphical representation of the first physical component, to display a graphical representation of a keyboard concurrently with the graphical representation of the first physical component and the identified portion of the retrieved historical data, and to modify repeatedly an appearance of the graphical representation of the keyboard to indicate a key of the keyboard selected by an operator during the time span to instruct the first physical component to perform an action in accordance with the keystroke data at a speed defined by the one or more screen replay options.

2. The device of claim 1, wherein the computer-executable instructions, when executed by the processor, further cause the processor to at least:
   determine one or more second screen replay options based on an output of a trained artificial intelligence model;
   retrieve second historical data corresponding to the one or more second replay options at a time based on the output of the trained artificial intelligence model; and
   update the updated user interface to display an indication of the retrieved second historical data in response to a request to view a replay of data corresponding to the plurality of physical components.

3. The device of claim 1, wherein the computer-executable instructions, when executed by the processor, further cause the processor to at least:
   retrieve the keystroke data corresponding to the one or more screen replay options; and
   update the user interface to modify repeatedly an appearance of the graphical representation of the first physical component in accordance with the identified portion of the retrieved historical data that corresponds to the graphical representation of the first physical component and to display the retrieved keystroke data at a speed defined by the one or more screen replay options.

4. The device of claim 1, wherein the updated user interface depicts a pop-up window that appeared during the time span in a same location in the user interface that the pop-up window appeared during the time span.

5. The device of claim 4, wherein the pop-up window displays a message indicating that the first physical component has failed.

6. The device of claim 1, wherein the updated user interface comprises a slider configured to move along a slider bar, and wherein a position of the slider along the slider bar controls a portion of the portion of the retrieved historical data that is displayed in the updated user interface.

7. The device of claim 6, wherein the computer-executable instructions, when executed by the processor, further cause the processor to at least update the user interface to modify repeatedly the appearance of the graphical representation of the first physical component in accordance with the identified portion of the retrieved historical data and a current position of the slider along the slider bar at the speed defined by the one or more screen replay options.

8. The device of claim 6, wherein the one or more screen replay options comprise at least one of a start time, a start date, a historical data replay interval, or a number of times per second that the slider moves along the slider bar.

9. The device of claim 6, wherein the portion of the retrieved historical data that corresponds to the graphical representation of the first physical component comprises a first measurement captured at a first time and a second measurement captured at a second time, wherein the first time and the second time are before the current time and fall within the time span defined by the one or more screen replay options, and wherein the computer-executable instructions, when executed by the processor, further cause the processor to at least:
   update the user interface to modify the appearance of the graphical representation of the first physical component to visually depict the first measurement based on the slider being at a position along the slider bar that corresponds with the first time; and
   update the updated user interface to modify the modified appearance of the graphical representation of the first physical component to visually depict the second measurement based on the slider moving from the position along the slider bar that corresponds with the first time to a position along the slider bar that corresponds with the second time,
   wherein the slider moves from the position along the slider bar that corresponds with the first time to the position along the slider bar that corresponds with the second time at the speed defined by the one or more screen replay options.

10. The device of claim 1, wherein the computer-executable instructions, when executed by the processor, further cause the processor to at least:
    process a selection of one or more second screen replay options received via the user interface;
    retrieve second historical data corresponding to the one or more second screen replay options;
    identify a portion of the retrieved second historical data that corresponds to the graphical representation of the first physical component; and
    update the user interface to display a first window and a second window, wherein an appearance of the graphical representation of the first physical component is repeatedly modified in the first window in accordance with the identified portion of the retrieved historical data that corresponds to the graphical representation of the first physical component at the speed defined by the one or more screen replay options, and wherein an appearance of the graphical representation of the first physical component is repeatedly modified in the second window in accordance with the identified portion of the retrieved second historical data that corresponds to the graphical representation of the first physical component at a speed defined by the one or more second screen replay options.

11. The device of claim 10, wherein the updated user interface displays the first window and the second window concurrently.

12. The device of claim 10, wherein the first window comprises a first slider that moves along a first slider bar to control the appearance of the graphical representation of the first physical component in the first window, wherein the second window comprises a second slider that moves along a second slider bar to control the appearance of the graphical representation of the first physical component in the second window, and wherein a movement of the first slider along the first slider bar is independent of a movement of the second slider along the second slider bar.

13. The device of claim 10, wherein the computer-executable instructions, when executed by the processor, further cause the processor to at least update the user interface to display the first window, the second window, and a third window, wherein the third window depicts, for each physical component in the plurality of physical components, the graphical representation of the respective physical component and the current measurement associated with the respective physical component.

14. The device of claim 13, wherein the updated user interface displays the first window, the second window, and the third window concurrently.

15. A computer-implemented method comprising:
as implemented by a user device having one or more processors and memory,
receiving a selection of one or more screen replay options via a user interface, wherein the one or more screen replay options corresponding to a time span before a current time, wherein the user interface depicts, for each physical component in a plurality of physical components, a graphical representation of the respective physical component and a current measurement associated with the respective physical component;
retrieving historical data and keystroke data corresponding to the one or more screen replay options;
identifying a portion of the retrieved historical data that corresponds to the graphical representation of a first physical component in the plurality of physical components; and
updating the user interface to modify repeatedly an appearance of the graphical representation of the first physical component to depict the identified portion of the retrieved historical data that corresponds to the graphical representation of the first physical component, to display a graphical representation of a keyboard concurrently with the graphical representation of the first physical component and the identified portion of the retrieved historical data, and to modify repeatedly an appearance of the graphical representation of the keyboard to indicate a key of the keyboard selected by an operator during the time span to instruct the first physical component to perform an action in accordance with the keystroke data at a speed defined by the one or more screen replay options.

16. The computer-implemented method of claim 15, further comprising:
receiving a selection of one or more second screen replay options via the user interface;
retrieving second historical data corresponding to the one or more second screen replay options;
identifying a portion of the retrieved second historical data that corresponds to the graphical representation of the first physical component; and
updating the user interface to display a first window and a second window, wherein an appearance of the graphical representation of the first physical component is repeatedly modified in the first window in accordance with the identified portion of the retrieved historical data that corresponds to the graphical representation of the first physical component at the speed defined by the one or more screen replay options, and wherein an appearance of the graphical representation of the first physical component is repeatedly modified in the second window in accordance with the identified portion of the retrieved second historical data that corresponds to the graphical representation of the first physical component at a speed defined by the one or more second screen replay options.

17. The computer-implemented method of claim 15, wherein updating the user interface further comprises:
retrieving the keystroke data corresponding to the one or more screen replay options; and
updating the user interface to modify repeatedly an appearance of the graphical representation of the first physical component in accordance with the identified portion of the retrieved historical data that corresponds to the graphical representation of the first physical component and to display the retrieved keystroke data at a speed defined by the one or more screen replay options.

18. The computer-implemented method of claim 15, wherein the updated user interface comprises a slider configured to move along a slider bar, and wherein a position of the slider along the slider bar controls a portion of the portion of the retrieved historical data that is displayed in the updated user interface.

19. The computer-implemented method of claim 18, wherein the portion of the retrieved historical data that corresponds to the graphical representation of the first physical component comprises a first measurement captured at a first time and a second measurement captured at a second time, wherein the first time and the second time are before the current time and fall within the time span defined by the one or more screen replay options, and wherein updating the user interface further comprises:
updating the user interface to modify the appearance of the graphical representation of the first physical component to visually depict the first measurement based on the slider being at a position along the slider bar that corresponds with the first time; and
updating the updated user interface to modify the modified appearance of the graphical representation of the first physical component to visually depict the second measurement based on the slider moving from the position along the slider bar that corresponds with the first time to a position along the slider bar that corresponds with the second time,
wherein the slider moves from the position along the slider bar that corresponds with the first time to the position along the slider bar that corresponds with the second time at the speed defined by the one or more screen replay options.

20. Non-transitory, computer-readable storage media comprising computer-executable instructions, wherein the computer-executable instructions, when executed by a processor, cause the processor to perform operations comprising:

receiving a selection of one or more screen replay options via a user interface, wherein the one or more screen replay options corresponding to a time span before a current time, wherein the user interface depicts, for each physical component in a plurality of physical components, a graphical representation of the respective physical component and a current measurement associated with the respective physical component;

retrieving historical data and keystroke data corresponding to the one or more screen replay options;

identifying a portion of the retrieved historical data that corresponds to the graphical representation of a first physical component in the plurality of physical components; and updating the user interface to modify repeatedly an appearance of the graphical representation of the first physical component to depict the identified portion of the retrieved historical data that corresponds to the graphical representation of the first physical component, to display a graphical representation of a keyboard concurrently with the graphical representation of the first physical component and the identified portion of the retrieved historical data, and to modify repeatedly an appearance of the graphical representation of the keyboard to indicate a key of the keyboard selected by an operator during the time span to instruct the first physical component to perform an action in accordance with the keystroke data at a speed defined by the one or more screen replay options.

21. The non-transitory, computer-readable storage media of claim 20, wherein the updated user interface comprises a slider configured to move along a slider bar, wherein the portion of the retrieved historical data that corresponds to the graphical representation of the first physical component comprises a first measurement captured at a first time and a second measurement captured at a second time, wherein the first time and the second time are before the current time and fall within the time span defined by the one or more screen replay options, and wherein the processor further performs operations comprising:

updating the user interface to modify the appearance of the graphical representation of the first physical component to visually depict the first measurement based on the slider being at a position along the slider bar that corresponds with the first time; and updating the updated user interface to modify the modified appearance of the graphical representation of the first physical component to visually depict the second measurement based on the slider moving from the position along the slider bar that corresponds with the first time to a position along the slider bar that corresponds with the second time, wherein the slider moves from the position along the slider bar that corresponds with the first time to the position along the slider bar that corresponds with the second time at the speed defined by the one or more screen replay options.

* * * * *